US012656625B2

(12) United States Patent
Gao et al.

(10) Patent No.: US 12,656,625 B2
(45) Date of Patent: Jun. 16, 2026

(54) DISPLAY DEVICE AND DRIVING METHOD THEREFOR

(71) Applicant: BEIJING SHIYAN TECHNOLOGY CO., LTD., Beijing (CN)

(72) Inventors: Jian Gao, Beijing (CN); Sen Ma, Beijing (CN); Tao Hong, Beijing (CN); Kuanjun Peng, Beijing (CN); Zhongyuan Wu, Beijing (CN); Fuqiang Li, Beijing (CN); Jing Yu, Beijing (CN)

(73) Assignee: BEIJING SHIYAN TECHNOLOGY CO., LTD., Beijing (CN)

( * ) Notice: Subject to any disclaimer, the term of this patent is extended or adjusted under 35 U.S.C. 154(b) by 58 days.

(21) Appl. No.: 18/720,870

(22) PCT Filed: Jun. 23, 2022

(86) PCT No.: PCT/CN2022/100799
§ 371 (c)(1),
(2) Date: Jun. 17, 2024

(87) PCT Pub. No.: WO2023/245551
PCT Pub. Date: Dec. 28, 2023

(65) Prior Publication Data
US 2025/0067994 A1 Feb. 27, 2025

(51) Int. Cl.
G02B 30/28 (2020.01)
G02B 27/00 (2006.01)
(Continued)

(52) U.S. Cl.
CPC ......... G02B 30/28 (2020.01); G02B 27/0081 (2013.01); G02B 27/0093 (2013.01);
(Continued)

(58) Field of Classification Search
CPC ............ G02B 27/0081; G02B 27/0093; G02B 27/026; G02B 27/0966; G02B 30/27;
(Continued)

(56) References Cited

U.S. PATENT DOCUMENTS

2015/0077667 A1* 3/2015 Lee ...................... H04N 13/305
359/463
2019/0180672 A1* 6/2019 Knez ...................... G09G 5/397
(Continued)

FOREIGN PATENT DOCUMENTS

CN 101702057 A 5/2010
CN 104137538 B 9/2017
(Continued)

*Primary Examiner* — Cory A Almeida
(74) *Attorney, Agent, or Firm* — Workman Nydegger

(57) ABSTRACT

A display device and a driving method therefor are disclosed. The display device comprises: a display panel, the display panel including a plurality of pixel islands arranged in an array in a row direction and a column direction, and each pixel island including n sub-pixels arranged at intervals in the row direction, where n is an integer greater than 1; and a light splitting assembly located on the display side of the display panel, the light splitting assembly including a plurality of light splitting repeating units which extend in the column direction and are successively arranged in the row direction, each light splitting repeating unit including M light splitting structures which extend in the column direction and are successively arranged in the row direction, each light splitting repeating unit correspondingly covering K columns of pixel islands, M and K being not equal.

16 Claims, 18 Drawing Sheets

(51) Int. Cl.

| | |
|---|---|
| *G02B 27/02* | (2006.01) |
| *G02B 27/09* | (2006.01) |
| *G02B 30/27* | (2020.01) |
| *G02B 30/29* | (2020.01) |
| *G02F 1/29* | (2006.01) |
| *G06F 3/01* | (2006.01) |
| *G09F 9/30* | (2006.01) |
| *G09G 3/00* | (2006.01) |
| *H04N 13/239* | (2018.01) |
| *H04N 13/305* | (2018.01) |
| *H04N 13/356* | (2018.01) |
| *H04N 13/383* | (2018.01) |

(52) U.S. Cl.

CPC ....... *G02B 27/026* (2013.01); *G02B 27/0966* (2013.01); *G02B 30/27* (2020.01); *G02B 30/29* (2020.01); *G02F 1/29* (2013.01); *G06F 3/013* (2013.01); *G09F 9/30* (2013.01); *G09G 3/003* (2013.01); *H04N 13/239* (2018.05); *H04N 13/305* (2018.05); *H04N 13/356* (2018.05); *H04N 13/383* (2018.05); *G09G 2300/0452* (2013.01); *G09G 2340/0407* (2013.01); *G09G 2354/00* (2013.01)

(58) Field of Classification Search

CPC ........... G02B 30/28; G02B 30/29; G02F 1/29; G06F 3/013; G09F 9/30; G09G 3/003; G09G 2300/0452; G09G 2340/0407; G09G 2354/00; H04N 13/239; H04N 13/305; H04N 13/356; H04N 13/383

See application file for complete search history.

(56) References Cited

U.S. PATENT DOCUMENTS

| | | | | |
|---|---|---|---|---|
| 2023/0410761 A1* | 12/2023 | Zong | .................... | H04N 13/398 |
| 2024/0005824 A1* | 1/2024 | Zhou | ..................... | G09G 3/003 |
| 2024/0306462 A1* | 9/2024 | Gao | ..................... | H10K 50/858 |

FOREIGN PATENT DOCUMENTS

| | | | |
|---|---|---|---|
| CN | 110488494 | A | 11/2019 |
| CN | 111552093 | A | 8/2020 |
| CN | 211857063 | U | 11/2020 |
| CN | 113903785 | A | 1/2022 |
| CN | 114390267 | A | 4/2022 |
| WO | 2022104750 | A1 | 5/2022 |
| WO | 2022110191 | A1 | 6/2022 |

* cited by examiner

Position 3
(0, 1000)

Position 4          Position 1          Position 5
(-100, 630)        (0, 630)            (100, 630)

Position 2
(0, 500)

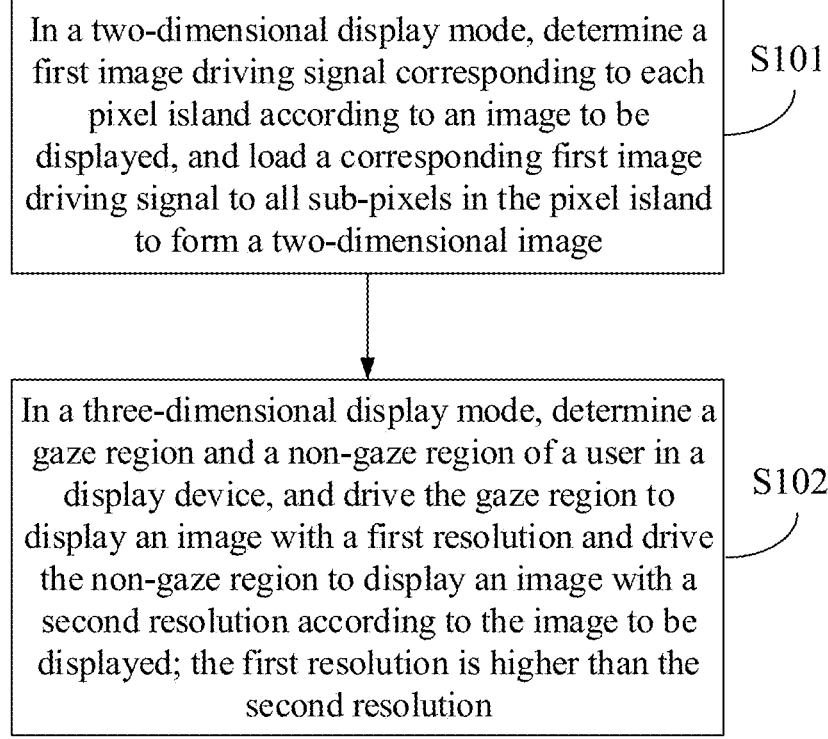

In a two-dimensional display mode, determine a first image driving signal corresponding to each pixel island according to an image to be displayed, and load a corresponding first image driving signal to all sub-pixels in the pixel island to form a two-dimensional image    S101

In a three-dimensional display mode, determine a gaze region and a non-gaze region of a user in a display device, and drive the gaze region to display an image with a first resolution and drive the non-gaze region to display an image with a second resolution according to the image to be displayed; the first resolution is higher than the second resolution    S102

Fig. 17

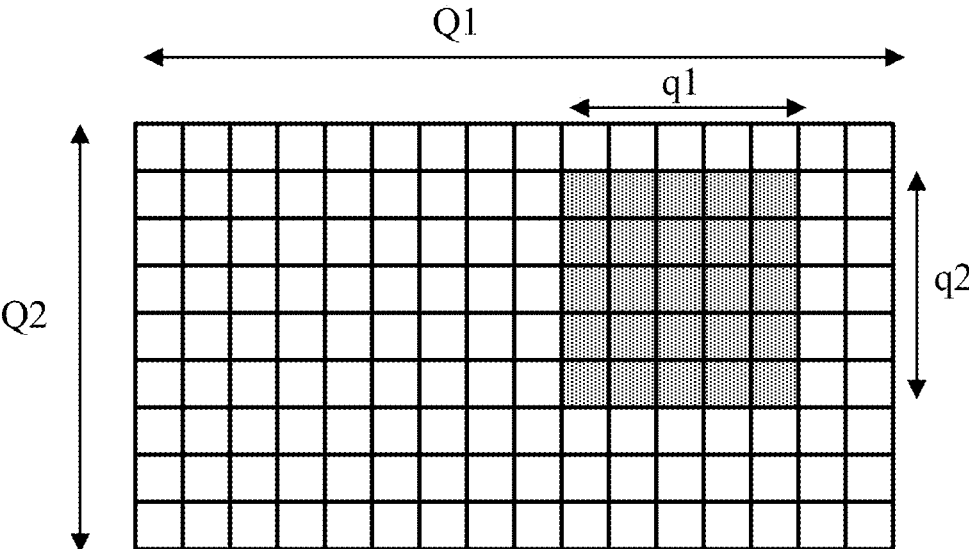

Fig. 18

Eyebrow center coordinate

Main lobe

DISPLAY DEVICE AND DRIVING METHOD THEREFOR

This application is a National Stage of International Application No. PCT/CN2022/100799, filed on Jun. 23, 2022, which is hereby incorporated by reference in its entirety.

FIELD

The present disclosure relates to the technical field of display, and particularly to a display device and a driving method thereof.

BACKGROUND

With the continuous development of a display technology, a three-dimensional (3D) display technology has attracted more and more attention. The three-dimensional display technology can make a display picture stereoscopic and realistic. The principle is that a left eye image and a right eye image with a certain parallax are received by people's left and right eyes respectively. After the two parallax images are received by people's left and right eyes respectively, a 3D visual display effect can be constructed by superimposing and fusing image information through a brain.

However, 3D display products in related art have a problem of visual fatigue.

SUMMARY

A display device provided by an embodiment of the present disclosure includes: a display panel, including a plurality of pixel islands arranged in an array in a row direction and a column direction, where each of the plurality of pixel islands includes n sub-pixels arranged at intervals in the row direction, and n is an integer greater than 1: a light splitting assembly, located at a display side of the display panel, where the light splitting assembly includes a plurality of light splitting repeating units extending in the column direction and successively arranged in the row direction; each of the light splitting repeating units includes M light splitting structures extending in the column direction and successively arranged in the row direction: each light splitting repeating unit correspondingly covers K columns of pixel islands: M and K are not equal, and a projection width of a main lobe angle of view formed by light emitted by K×n sub-pixels at an optimal viewing distance of the display device is greater than or equal to ⅔ of a pupil distance.

In some embodiments, K×n and M are coprime.

In some embodiments, light emitted from light-emitting regions of sub-pixels in K pixel islands after being split by the M light splitting structures forms a successive light-emitting region in space.

In some embodiments, in a horizontal direction, a width of the M light splitting structures is equal to s width of the K columns of pixel islands.

In some embodiments, the sub-pixels include sub-pixel opening regions; and in the row direction, a ratio of a total width of the n sub-pixel opening regions to a width of each of the plurality of pixel islands is greater than or equal to 0.9/M and less than or equal to 1.

In some embodiments, in the row direction, a ratio of a width of each sub-pixel opening region to the width of the pixel island is i/M; and i is an integer greater than or equal to 1 and less than or equal to M−1.

In some embodiments, i=1, and in the row direction, the light-emitting regions of the sub-pixels in the K pixel islands are complementarily spliced with one another in space.

In some embodiments, i>1, and in the row direction, the light-emitting regions of the sub-pixels in the K pixel islands overlap in space.

In some embodiments, in the row direction, the light-emitting regions of the sub-pixels in the K pixel islands overlap evenly in space.

In some embodiments, in the row direction, an absolute value of a difference between widths of different sub-pixel opening regions is less than or equal to 2.5 microns.

In some embodiments, the display device further includes: a spacer dielectric layer, located between the light splitting assembly and the display panel.

In some embodiments, each light splitting structure is a cylindrical lens.

In some embodiments, the cylindrical lens includes a first resin layer with protrusions, and a planarized resin layer located on a side of the first resin layer facing away from the display panel; and a refractive index of the planarized resin layer is less than a refractive index of the first resin layer.

In some embodiments, the cylindrical lens is a liquid crystal lens.

In some embodiments, a radius of curvature of the cylindrical lens is greater than or equal to 1.01 r and less than or equal to 1.22 r; where, $$r = \frac{(n1 - n2)}{n3} \times \frac{n3L1P1}{W},$$

n1 is the refractive index of the first resin layer or an e-light refractive index of the liquid crystal lens, n2 is the refractive index of the planarized resin layer or an o-light refractive index of the liquid crystal lens, n3 is a refractive index of the spacer dielectric layer, L1 is the optimal viewing distance of the display device, P1 is a width of the cylindrical lens in the row direction, and W is the projection width of the main lobe angle of view formed by the light emitted by the sub-pixels at the optimal viewing distance.

In some embodiments, M is 3, K is 1, and n is 10; or M is 3, K is 1 and n is 32: or M is 3, K is 2 and n is 32: or, M is 3, K is 4 and n is 32.

In some embodiments, every three pixel islands successively arranged in the column direction are a pixel repeating unit; and in the pixel repeating unit, display colors of the sub-pixels of a same pixel island are identical, and display colors of the sub-pixels of different pixel islands are different.

In some embodiments, the display device further includes: an eye tracking system, configured to determine a position of user's eyes in real time.

A driving method of the display device provided by an embodiment of the present disclosure includes: determining a first image driving signal corresponding to each of the plurality of pixel islands according to an image to be displayed in a two-dimensional display mode, and loading the corresponding first image driving signal to all sub-pixels in the pixel islands to form a two-dimensional image: determining a gaze region and a non-gaze region of a user in the display device in a three-dimensional display mode, driving the gaze region to display an image with a first resolution and driving the non-gaze region to display an image with a second resolution according to the image to be displayed, where the first resolution is higher than the second resolution.

In some embodiments, the determining the gaze region and the non-gaze region of the user in the display device includes: acquiring the gaze region of the user's eyes in the display device through the eye tracking system; and determining a region in the display device other than the gaze region as the non-gaze region.

In some embodiments, the driving the gaze region to display the image with the first resolution and driving the non-gaze region to display the image with the second resolution according to the image to be displayed includes: determining coordinates of user's eyes through an eye tracking system, and determining a left eye view and a right eye view according to the coordinates of the user's eyes; rendering a plurality of first resolution images corresponding to the first resolution and a plurality of second resolution images corresponding to the second resolution according to the left-eye view and the right-eye view; determining a sub-pixel corresponding to the left-eye view and a sub-pixel corresponding to the right-eye view in each pixel island group, where each pixel island group includes K columns of pixel islands correspondingly covered by a light splitting repeating unit, and a direction of a connecting line of left and right eyes of the user is parallel to the row direction: providing a driving signal corresponding to the left eye view to the sub-pixel corresponding to the left eye view; and providing a driving signal corresponding to the right eye view to the sub-pixel corresponding to the right eye view according to the first resolution images in the gaze region; and providing a driving signal corresponding to the left eye view to the sub-pixel corresponding to the left eye view; and providing a driving signal corresponding to the right eye view to the sub-pixel corresponding to the right eye view according to the second resolution images in the non-gaze region.

In some embodiments, the eye tracking system includes N/2 first cameras and N/2 second cameras, where N=K×n and K×n is an even number: the determining coordinates of the user's eyes through the eye tracking system, and determining the left eye view and the right eye view according to the coordinates of the user's eyes includes: determining central coordinates of the user's eyes and a central viewpoint corresponding to the central coordinates: setting (N−1) first viewpoints in a region corresponding to the user's left eye according to a preset viewpoint interval from the central viewpoint, and setting N second viewpoints in a region corresponding to the user's right eye according to the preset viewpoint interval from the central viewpoint: setting N/2 the first cameras respectively at the $(N/2)^{th}$ first viewpoint to the $(N-1)^{th}$ first viewpoint, setting the N/2 second cameras respectively at the $[(N/2)+1]^{th}$ second viewpoint to the $N^{th}$ second viewpoint, obtaining the left eye view by using the N/2 first cameras, and obtaining the right eye view by using the N/2 second cameras.

In some embodiments, the determining the sub-pixel corresponding to the left eye view and the sub-pixel corresponding to the right eye view in each pixel island group includes: acquiring a light-emitting angular spectrum of each sub-pixel to obtain an angular spectrum boundary database; determining coordinates of a center of the user's eyes according to the coordinates of the user's eyes; determining an included angle between the center of the user's eyes and a center of each pixel island group; and determining a central sub-pixel corresponding to the center of the user's eyes according to the included angle between the center of the user's eyes and the center of each pixel island group and the light-emitting angle spectrum of each sub-pixel; where if the coordinates of the center of the user's eyes are in a left half of the central sub-pixel, the central sub-pixel and (N/2)−1 sub-pixels on a right side of the central sub-pixel correspond to the right eye view; and the N/2 sub-pixels on a left side of the central sub-pixel correspond to the left eye view; and if the coordinates of the center of the user's eyes are in a right half of the central sub-pixel, N/2 sub-pixels on the right side of the central sub-pixel correspond to the right eye view; and the central sub-pixel and the (N/2)−1 sub-pixels on the left side of the central sub-pixel correspond to the left eye view.

In some embodiments, the eye tracking system includes (N+1)/2 first cameras and (N+1)/2 second cameras, where N=K×n and K×n is an odd number: the determining coordinates of the user's eyes through the eye tracking system, and determining the left eye view and the right eye view according to the coordinates of the user's eyes includes: determining central coordinates of the user's eyes and a central viewpoint corresponding to the central coordinates: setting N first viewpoints in a region corresponding to the user's left eye according to a preset viewpoint interval from the central viewpoint, and setting N second viewpoints in a region corresponding to the user's right eye according to the preset viewpoint interval from the central viewpoint: setting the (N+1)/2 first cameras respectively at $[(N+1)/2]^{th}$ first viewpoints to $N^{th}$ first viewpoints, setting the (N+1)/2 second cameras respectively at $[(N+1)/2]^{th}$ second viewpoint to the $N^{th}$ second viewpoint, obtaining the left eye view by using the (N+1)/2 first cameras, and obtaining the right eye view by using the (N+1)/2 second cameras.

In some embodiments, the determining sub-pixel corresponding to the left eye view and sub-pixel corresponding to the right eye view in each pixel island group includes: acquiring a light-emitting angular spectrum of each sub-pixel to obtain an angular spectrum boundary database; determining coordinates of a center of the user's eyes according to the coordinates of the user's eyes; determining an included angle between the center of the user's eyes and a center of each pixel island group; and determining a central sub-pixel corresponding to the center of the user's eyes according to the included angle between the center of the user's eyes and the center of each pixel island group and the light-emitting angle spectrum of each sub-pixel; where (N−1)/2 sub-pixels on the right side of the central sub-pixel correspond to the right eye view; and the (N−1)/2 sub-pixels on the left side of the central sub-pixel correspond to the left eye view; and when the coordinates of the center of the user's eyes are in the left half of the central sub-pixel, the central sub-pixel corresponds to the left eye view; and when the coordinates of the center of the user's eyes are in the right half of the central sub-pixel, the central sub-pixel corresponds to the right eye view.

BRIEF DESCRIPTION OF DRAWINGS

In order to explain technical solutions in embodiments of the present disclosure more clearly, drawings required in the description of embodiments will be briefly introduced below. Obviously, the drawings in the following description are only some embodiments of the present disclosure. For those ordinarily skilled in the art, other drawings can further be obtained according to these drawings without creative work.

FIG. 17 is a flowchart of a driving method of a display device provided by an embodiment of the present disclosure.

FIG. 18 is a schematic partition diagram of a display region of a display device provided by an embodiment of the present disclosure.

DETAILED DESCRIPTION OF EMBODIMENTS

Figure 1:
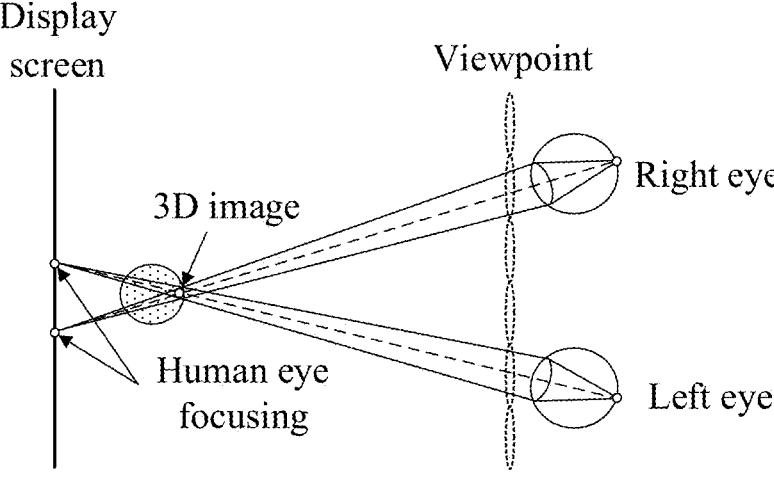
FIG. 1 is a schematic diagram of a 3D display principle of the related art.

In order to make objectives, technical solutions and advantages of embodiments of the present disclosure clearer, the technical solutions of embodiments of the present disclosure will be described clearly and completely with the attached drawings. Obviously, the described embodiments are a part of embodiments of the present disclosure, not all of embodiments. Embodiments in the present disclosure and features in embodiments may be combined with one another without conflict. Based on the described embodiments of the present disclosure, all other embodiments obtained by those ordinarily skilled in the art without creative labor belong to the scope of protection of the present disclosure.

Unless otherwise defined, technical terms or scientific terms used in the present disclosure shall have their ordinary meanings as understood by those ordinarily skilled in the art to which the present disclosure belongs. The terms "first", "second" and the like used in the present disclosure do not indicate any order, quantity or importance, but are only used to distinguish different components. Similar words such as "including" or "containing" mean that the elements or objects appearing before the word cover the elements or objects listed after the word and their equivalents, without excluding other elements or objects. Similar words such as "connect" or "connected" are not limited to physical or mechanical connection, but may include electrical connection, whether direct or indirect.

It should be noted that dimensions and shapes of the figures in the attached drawings do not reflect the true scale, and are only intended to schematically illustrate the present disclosure. In addition, the same or similar reference numerals indicate the same or similar elements or elements with the same or similar functions throughout.

It should be noted that, as shown in FIG. 1, a single viewpoint of a 3D display product in the related art covers a whole pupil, which causes human eyes to focus on a display screen, but a 3D image generated by the brain is out of the display screen. That is, a focus depth of a single eye is inconsistent with a convergence depth of double eyes, thereby causing visual fatigue, and further causing users to have bad experiences such as dizziness.

Figure 2:
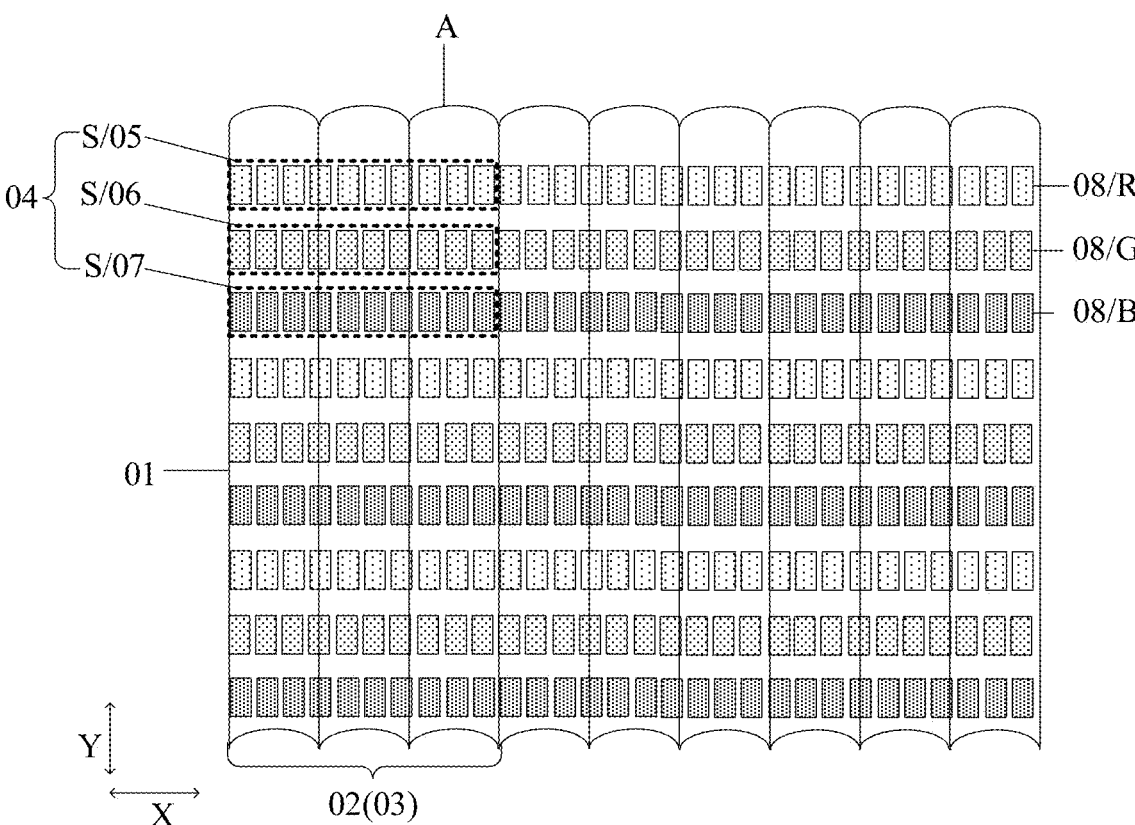
FIG. 2 is a schematic structural diagram of a display device provided by an embodiment of the present disclosure.

In view of above problems existing in the related art, an embodiment of the present disclosure provides a display device, as shown in FIG. 2, including: a display panel 01, including a plurality of pixel islands S arranged in an array in a row direction X and a column direction Y, where each of the plurality of pixel islands S includes n sub-pixels 08 arranged at intervals in the row direction X, and n is an integer greater than 1; and a light splitting assembly 02, located at a display side of the display panel 01, where the light splitting assembly 02 includes a plurality of light splitting repeating units 03 extending in the column direction Y and successively arranged in the row direction X; each of the light splitting repeating units 03 includes M light splitting structures A extending in the column direction Y and successively arranged in the row direction X; each light splitting repeating unit correspondingly covers K columns of pixel islands S; M and K are not equal, and a projection width of a main lobe angle of view formed by light emitted by K×n sub-pixels at an optimal viewing distance of the display device is greater than or equal to ⅔ of a pupil distance.

According to the display device provided by an embodiment of the present disclosure, the projection width of the main lobe angle of view formed by the light emitted by the K×n sub-pixels at the optimal viewing distance of the display device is greater than or equal to ⅔ of the pupil distance, so that a plurality of different parallax images may enter the pupil on the basis that the left and right eyes have a correct parallax, a focus depth of a single eye is consistent with a convergence depth of double eyes, viewing is free from dizziness, and visual fatigue is avoided.

It should be noted that an angle of view includes the main lobe angle of view and a side lobe angle of view. The main lobe angle of view refers to an angle of view formed in space after the light emitted by the sub-pixels is split by a light splitting structure directly above the sub-pixels. The side lobe angle of view refers to the angle of view formed by the light emitted by the sub-pixels passing through a light splitting structure beside the light splitting structure directly above the sub-pixels. For example, the angle of view passing through a first light splitting structure adjacent to the light splitting structure directly above is a first-order side lobe angle of view; and the angle of view passing through a second light splitting structure adjacent to the light splitting structure directly above is a second-order side lobe angle of view, and so on.

It should be noted that the display device provided by an embodiment of the present disclosure may be applied to 3D display, for example, super multi-view light field display, and may also switch between 3D and 2D display. A pixel island may be used as a sub-pixel of 2D display. Since a pixel island includes a plurality of sub-pixels, the same resolution may be maintained in a 3D display mode as 2D display. Combined with an eye tracking system, multi-view display with a large angle of view can be realized, and 3D display with higher pixels per inch (ppi) can further be realized with more amount of information and lower color crosstalk between adjacent viewpoints.

It should be noted that the quantity of pixel islands is a resolution of 2D display, so for the size of the pixel islands, it is necessary to realize 2D display with a retina-level resolution, that is, an included angle between the pixel islands and human eyes is 1', and the corresponding display device has the optimal viewing distance that meets the above requirements. In order to ensure that there is no crosstalk between left and right eyes of 3D display at the optimal viewing distance, it is necessary to maximize the quantity of viewpoint intervals between the left and right eyes at the optimal viewing distance, so that a sum of viewpoint widths at the optimal viewing distance where repeated viewpoints do not appear and a pupillary distance d satisfy:

$$D = \left(\frac{1}{2} + m\right)W;$$

where m is an integer greater than or equal to 0, and W is the sum of the viewpoint widths at the optimal viewing distance where repeated viewpoints do not appear, namely a projection width of the main lobe angle of view at the optimal viewing distance. With the increase of m, the viewpoint density may gradually increase. In order to solve the visual fatigue caused by convergence conflict, it is necessary to ensure that a plurality of viewpoints enter the pupil. Therefore, m≥1, and thus W≥2D/3, which may realize that a plurality of viewpoints enter the pupil. However, with the increase of m, although the viewpoint density may gradually increase, a moving range of the human eyes may gradually decrease. Therefore, in order to balance the viewpoint density and the moving range of the human eyes, in some embodiments, m=1, W=2D/3, that is, the projection width of the main lobe angle of view formed by the light emitted by K×n sub-pixels at the optimal viewing distance of the display device is equal to ⅔ of the pupil distance.

During specific implementation, the light splitting structures are used to control a light-emitting angle of each sub-pixel to make the sub-pixel emit light directionally.

During specific implementation, the display panel may be one of a liquid crystal display panel (LCD), an organic light emitting diode (OLED) display panel, a quantum dot light emitting diode (QLED), a micro inorganic light emitting diode (micro LED) display panel or a mini light emitting diode (mini LED) display panel.

In some embodiments, as shown in FIG. 2, every three pixel islands S successively arranged in the column direction Y are a pixel repeating unit 04.

In the pixel repeating unit 04, display colors of the sub-pixels 08 of a same pixel island S are identical, and display colors of the sub-pixels 08 of different pixel islands S are different.

In some embodiments, as shown in FIG. 2, the pixel repeating unit 04 includes a first pixel island 05, a second pixel island 06 and a third pixel island 07. The first pixel island 05 includes a plurality of red sub-pixels R, the second pixel island 06 includes a plurality of green sub-pixels G, and the third pixel island 07 includes a plurality of blue sub-pixels B.

In some embodiments, as shown in FIG. 2, the display colors of the sub-pixels 08 in a row of pixel islands S are identical.

In some embodiments, light emitted from light-emitting regions of the sub-pixels in the K pixel islands after being split by the M light splitting structures forms a successive light-emitting region in space.

During specific implementation, because the size of each light splitting structure is small in the row direction, the human eyes cannot tell which light splitting structure the light is emitted from for the K×n sub-pixels corresponding to the M light splitting structures, so it seems to the human eyes that the emitted light of the K×n sub-pixels after being split by the M light splitting structures above the sub-pixels forms a successive light-emitting region in space, and the human eyes cannot see a "black region" when moving in a visual space.

In some embodiments, the light-emitting regions of the sub-pixels in the K pixel islands are staggered in space, so that emitting rays of the light emitted by the sub-pixels in the K pixel islands after being split by the M light splitting structures form a successive light-emitting region in space, thereby eliminating moire patterns.

It should be noted that the space in "the light-emitting regions of the sub-pixels in the K pixel islands are staggered in space" refers to a visible space of the display device.

In some embodiments, the sub-pixels include sub-pixel opening regions; and in the row direction, widths of the sub-pixel opening regions are identical.

In order to better understand this solution, taking the main lobe angle of view as an example, a situation that the light-emitting regions of the sub-pixels in K pixel islands are staggered in space, and the light emitted from the light-emitting regions of the sub-pixels in the K pixel islands after being split by the M light splitting structures forms a successive light-emitting region in space is illustrated.

During specific implementation, among the M light splitting structures arranged in the row direction, a difference between viewpoints of every two adjacent sub-pixels is M among a plurality of sub-pixels corresponding to each light splitting structure.

Figure 3:
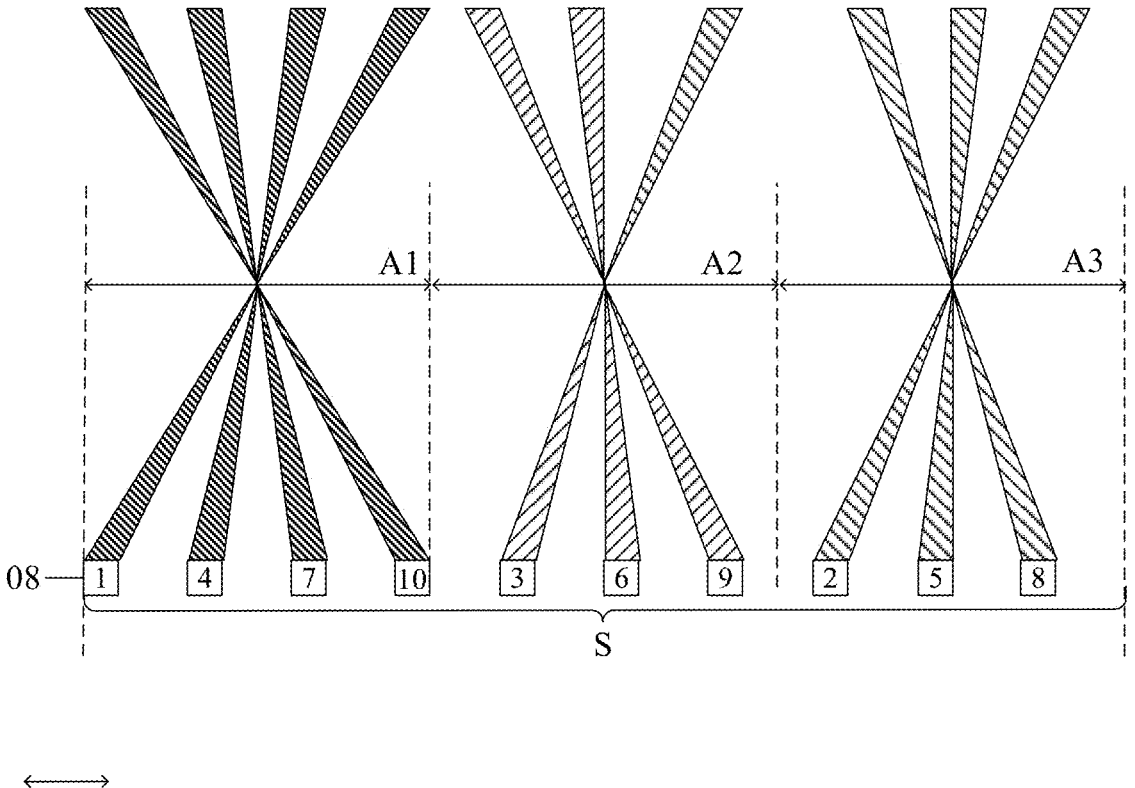
FIG. 3 is a light path diagram of light emitting of sub-pixels of a display device provided by an embodiment of the present disclosure.
Figure 4:
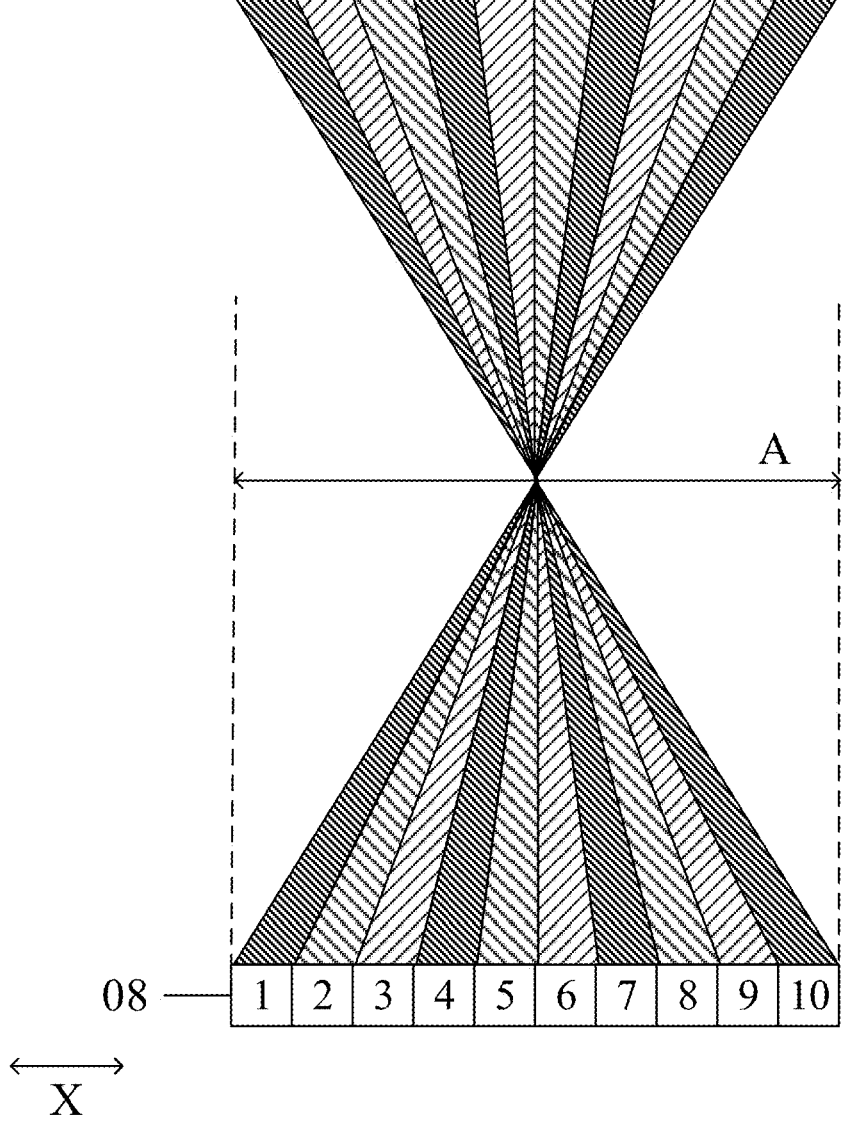
FIG. 4 is a light path diagram of light emitting after splicing of sub-pixels of a display device provided by an embodiment of the present disclosure.

In some embodiments, K is 1, M is 3, and n is 10, and optical path diagrams of the K columns of pixel islands are shown in FIG. 3 and FIG. 4. One pixel island corresponding to the three light splitting structures includes 10 sub-pixels, which are respectively labeled as a first sub-pixel 1 to a tenth sub-pixel 10, and a serial number of each sub-pixel represents a corresponding viewpoint of the sub-pixel. The sub-pixels in the pixel island are arranged according to the corresponding viewpoint order as follows: a first sub-pixel 1, a fourth sub-pixel 4, a seventh sub-pixel 7, a tenth sub-pixel 10, a third sub-pixel 3, a sixth sub-pixel 6, a ninth sub-pixel 9, a second sub-pixel 2, a fifth sub-pixel 5, and an eighth sub-pixel 8. The light splitting structures corresponding to the 10 sub-pixels are respectively labeled as a first light splitting structure A1 to a third light splitting structure A3. As shown in FIG. 3, the first light splitting structure A1 covers the first sub-pixel 1, the fourth sub-pixel 4, the seventh sub-pixel 7 and the tenth sub-pixel 10, the second light splitting structure A2 covers the third sub-pixel 3, the sixth sub-pixel 6 and the ninth sub-pixel 9, and the third light splitting structure A3 covers the second sub-pixel 2, the fifth sub-pixel 5 and the eighth sub-pixel 8. As shown in FIG. 3, a relative position relationship between each sub-pixel in a pixel island and the light splitting structure does not constitute a repeating unit. If the sub-pixels are spliced according to the viewpoint order, and the relative position between each sub-pixel and the light splitting structure remains unchanged, as shown in FIG. 4, after the sub-pixels corresponding to each light splitting structure are spliced, the positions of the sub-pixels are complementary, that is, a gap among the sub-pixels is 0), and the relative position relationship between each sub-pixel and the light splitting structure forms a staggered and complementary arrangement mode. Correspondingly, the light-emitting regions of the sub-pixels in a pixel island are arrayed in a staggered mode in space, and also form a staggered and complementary arrangement mode in space. As shown in FIG. 3, because there are gaps among the sub-pixels, the light emitted by the adjacent sub-pixels corresponding to the same light splitting structure A is not successive in space. However, since the relative positions of the sub-pixels in a pixel island and three light splitting structures A are arrayed in a staggered mode, and the light-emitting regions of the sub-pixels in a pixel island are staggered in space, the light-emitting angles of the light splitting structures A are also staggered and complementary: Because the size of each light splitting structure A is very small, it is impossible for the human eyes to tell which light splicing structure A is the light emitted from. Therefore, as shown in FIG. 4, it seems to the human eyes that the light emitted by 10 sub-pixels in a pixel island after being split by three light splitting structures forms a successive light-emitting region in space, and the human eyes may not see a "black region" when moving in space.

The successiveness of the side lobe angle of view is the same as that of the main lobe angle of view; and two non-successive first-order side lobe angles of view of K pixel islands through adjacent light splitting structures may complement each other into a successive first-order side lobe angle of view. Moreover, a width of the M light splitting structures in the horizontal direction is equal to a width of the K columns of pixel islands, so a main lobe angle of view boundary is parallel to a side lobe angle of view boundary. Because the human eyes cannot distinguish a distance between the main lobe angle of view boundary and the side lobe angle of view boundary, the main lobe angle of view and the side lobe angle of view are also observed to be successive. In the same way, the first-order side lobe angle of view and the second-order side lobe angle of view are also successive, and the second-order side lobe angle of view and the third-order side lobe view angle are also successive, and so on. In this way, a successive angle of view is obtained.

In some embodiments, K×n and M are coprime.

In some embodiments, in the horizontal direction, the width of the M light splitting structures is equal to the width of the K columns of pixel islands.

In some embodiments, the sub-pixels include sub-pixel opening regions; and in the row direction, a ratio of a total width of the n sub-pixel opening regions to a width of each pixel island is greater than or equal to 0.9/M and less than or equal to 1.

In some embodiments, in the row direction, a ratio of a width of each sub-pixel opening region to the width of the pixel island is i/M; and i is an integer greater than or equal to 1 and less than or equal to M−1.

In some embodiments, i=1, and in the row direction, the light-emitting regions of the sub-pixels in the K pixel islands are complementarily spliced in space.

In some embodiments, when i=1, as shown in FIG. 3, in the row direction X, the ratio of the total width of the n sub-pixels 08 opening regions to the width of the pixel island 1 is 1/M. That is, an aperture ratio of the sub-pixels in the pixel islands is 1/M. In this way, the sub-pixels below each light splitting repeating unit may be arranged in a staggered and complementary manner relative to the corresponding light splitting structure, so that the light-emitting regions of the sub-pixels in the K pixel islands are complementarily spliced in space, that is, the optical paths of the viewpoints are closely connected, so that moire patterns may be eliminated, and the display effect may be improved.

Alternatively, in some embodiments, i>1, and in the row direction, the light-emitting regions of the sub-pixels in the K pixel islands overlap in space.

In some embodiments, in the row direction, the light-emitting regions of the sub-pixels in the K pixel islands overlap evenly in space.

Next, still taking the main lobe angle of view as an example, a situation that the light emitted from the light-emitting regions of the sub-pixels in the K pixel islands after being split by the M light splitting structures forms a successive light-emitting region in space is illustrated.

Figure 5:
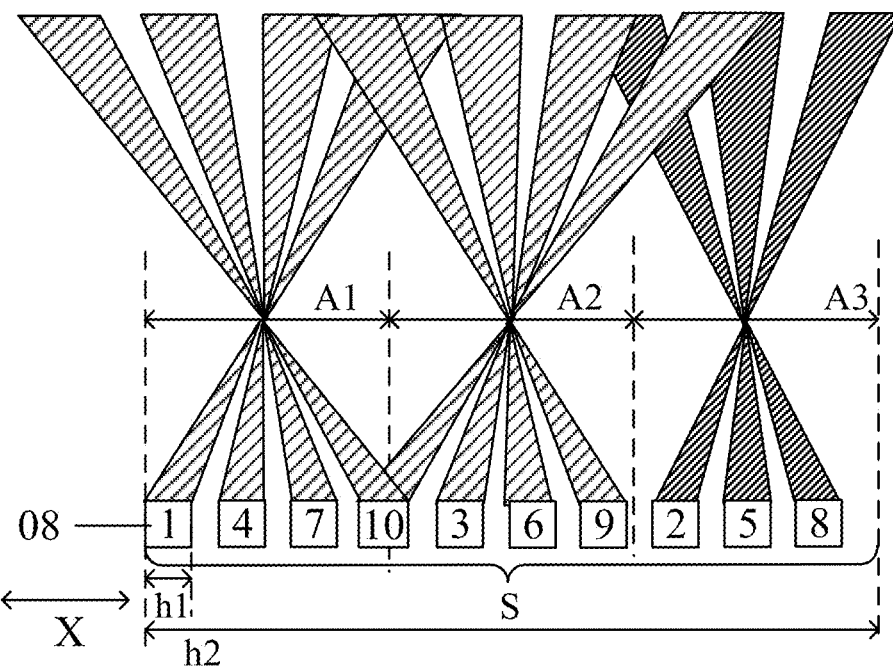
FIG. 5 is a light path diagram of light emitting of sub-pixels of another display device provided by an embodiment of the present disclosure.
Figure 6:
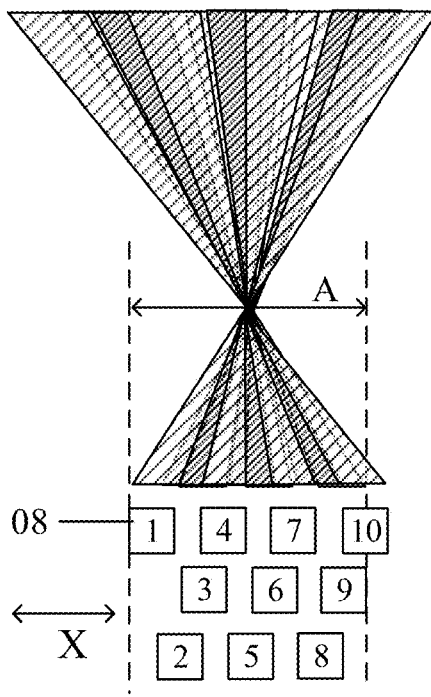
FIG. 6 is a light path diagram of light emitting after splicing of sub-pixels of another display device provided by an embodiment of the present disclosure.

In some embodiments, K is 1, M is 3, and n is 10, and optical path diagrams of the K columns of pixel islands are shown in FIG. 5 and FIG. 6. One pixel island corresponding to the three light splitting structures includes 10 sub-pixels, which are respectively labeled as a first sub-pixel 1 to a tenth sub-pixel 10, and a serial number of each sub-pixel represents a corresponding viewpoint of the sub-pixel. As shown in FIG. 5, a relative position relationship between each sub-pixel in a pixel island and the light splitting structure does not constitute a repeating unit. If the sub-pixels are spliced according to the viewpoint order, and the relative position of each sub-pixel and the light splitting structure remains unchanged, as shown in FIG. 6, after the sub-pixels corresponding to each light splicing structure are spliced, the positions of the sub-pixels are overlapped, and the relative position relationship between each sub-pixel and the light splitting structure forms a staggered overlapping arrangement mode. Correspondingly, the light-emitting regions of the sub-pixels in a pixel island are staggered in space, and the light-emitting regions of the sub-pixels in a pixel island also form staggered and complementary arrangement mode in space. As shown in FIG. 5, because there are gaps among the sub-pixels, the light emitted by the adjacent sub-pixels corresponding to the same light splitting structure A is not successive in space. However, since the relative positions of the sub-pixels in a pixel island and three light splitting structures A are staggered and evenly overlapped, and the light-emitting regions of the sub-pixels in a pixel island are evenly overlapped in space, the light-emitting angles of the light splitting structures A are also staggered and evenly overlapped. Because the size of each light splitting structure A is very small, it is impossible for the human eyes to tell which light splitting structure is light emitted from. Therefore, as shown in FIG. 6, it seems to the human eyes that the light emitted by the 10 sub-pixels in a pixel island after being split by the three light splitting structures forms a successive light-emitting region in space, and the human eyes may not see a "black area" when moving in space.

In some embodiments, as shown in FIG. 5, in the row direction, the ratio of the total width n×h1 of the n sub-pixel opening regions to the width h2 of the pixel island is i/M; and i is an integer greater than 1 and less than or equal to M−1. That is, the aperture ratio of the sub-pixels in the pixel island is i/M. In this way, the sub-pixels below each light splitting repeating unit may be arranged in a staggered and evenly overlapped manner relative to the position of the corresponding light splitting structure, so that the light-emitting regions of the sub-pixels in the K pixel islands are evenly overlapped in space, that is, the optical paths of all viewpoints are evenly overlapped, and moire patterns may also be eliminated, and the display effect may be improved.

During specific implementation, when i>1, and when the light-emitting regions of the sub-pixels in the K pixel islands overlap evenly in space, a ratio of an area of an overlapping region of light-emitting regions of two sub-pixels with adjacent serial numbers to an area of an light-emitting region of one of the two sub-pixels is (i−1)/i. A ratio of the area of the overlapping region of light-emitting regions of two sub-pixels with adjacent serial numbers to an area of one of the two sub-pixels is (i−1)/M.

It should be noted that in FIG. 5, the ratio of the total width of the opening regions of the sub-pixels 08 to the width of the pixel island S in the row direction X being ⅔ is taken as an example, that is, the ratio of the total width of the n sub-pixel opening regions to the width of pixel island in the row direction is (M−1)/M. That is, the aperture ratio of the sub-pixels in the pixel island in FIG. 5 is ⅔. When the aperture ratio of the sub-pixels in the pixel island is (M−1)/M, the aperture ratio of the sub-pixels may be increased to the maximum extent under the condition that the light-emitting regions of the sub-pixels in the K pixel islands overlap evenly in the row direction.

During specific implementation, when the light-emitting regions of the sub-pixels in the K pixel islands overlap evenly in space, the ratio of the area of the overlapping region of the light-emitting regions of two sub-pixels with adjacent serial numbers to the area of the light-emitting region of one of the two sub-pixels is (i−1)/i. The ratio of the area of the overlapping region of the light-emitting regions of two sub-pixels with adjacent serial numbers to the area of one of the two sub-pixels is (i−1)/M.

It should be noted that when the ratio of the total width of n sub-pixel opening regions to the width of the pixel island in the row direction is 1/M, namely, i=1, the light-emitting regions of the sub-pixels do not overlap in space. When i=2, the ratio of the area of the overlapping region of the light-emitting regions of two sub-pixels with adjacent serial numbers to the area of the light-emitting region of one of the two sub-pixels is ½, and the ratio of the area of the overlapping region of the light-emitting regions of the two sub-pixels with the adjacent serial numbers to the area of one of the two sub-pixels is 1/M. When i=3, the ratio of the area of the overlapping region of the light-emitting regions of two sub-pixels with adjacent serial numbers to the area of the light-emitting region of one of the two sub-pixels is ⅔, and the ratio of the area of the overlapping region of the light-emitting regions of the two sub-pixels with the adjacent serial numbers to the area of one of the two sub-pixels is 2/M. When i=4, the ratio of the area of the overlapping region of the light-emitting regions of two sub-pixels with adjacent serial numbers to the area of the light-emitting region of one of the two sub-pixels is ¾, and the ratio of the area of the overlapping region of the light-emitting regions of the two sub-pixels with the adjacent serial numbers to the area of one of the two sub-pixels is 3/M. When i=M−1, the ratio of the area of the overlapping region of the light-emitting regions of two sub-pixels with adjacent serial numbers to the area of the light-emitting region of one of the two sub-pixels is (M−2)/(M−1), and the ratio of the area of the overlapping region of the light-emitting regions of the two sub-pixels with the adjacent serial numbers to the area of one of the two sub-pixels is (M−2)/M; and so on, which will not be repeated.

Figure 7:
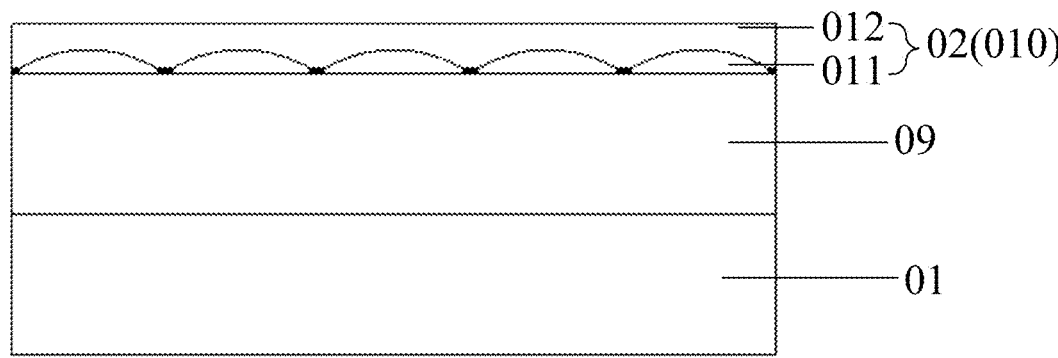
FIG. 7 is a schematic structural diagram of another display device provided by an embodiment of the present disclosure.

In some embodiments, as shown in FIG. 7, the display device further includes: a spacer dielectric layer 09, located between the light splitting assembly 02 and the display panel 01.

In some embodiments, each light splitting structure is a cylindrical lens.

In some embodiments, as shown in FIG. 7, the cylindrical lens 010 includes a first resin layer 011 with protrusions, and a planarized resin layer 012 located on a side of the first resin layer 011 facing away from the display panel 01. A refractive index of the planarized resin layer 012 is less than a refractive index of the first resin layer 011.

Alternatively, in some embodiments, the cylindrical lens is a liquid crystal lens.

Of course, during specific implementation, the light splitting structure may also be a geometric lens, a diffractive lens, a liquid lens and other structural devices that can control the light-emitting direction of the sub-pixels.

In some embodiments, a placement height of the light splitting structure, that is, a thickness H of the spacer dielectric layer, satisfies the following conditions:

$$H = \frac{n3L1P1}{W}.$$

Where L1 is the optimal viewing distance of the display device; and n3 is a refractive index of the spacer dielectric layer.

In some embodiments, the cylindrical lens includes a first resin layer with protrusions, and a planarized resin layer located on a side of the first resin layer facing away from the display panel; and a refractive index of the planarized resin layer is less than a refractive index of the first resin layer.

Alternatively, in some embodiments, the cylindrical lens is a liquid crystal lens.

In some embodiments, a radius of curvature of the cylindrical lens is greater than or equal to 1.01 r and less than or equal to 1.22 r.

Where, $$r = \frac{(n1 - n2)}{n3} \times \frac{n3L1P1}{W},$$

n1 is the refractive index of the first resin layer or an e-light refractive index of the liquid crystal lens, n2 is the refractive index of the planarized resin layer or an o-light refractive index of the liquid crystal lens, n3 is the refractive index of the spacer dielectric layer, L1 is the optimal viewing distance of the display device, and P1 is a width of the cylindrical lens in the row direction.

It should be noted that $$r = \frac{(n1 - n2)}{n3} \times \frac{n3L1P1}{W}$$

is an ideal value of the radius of curvature of the cylindrical lens obtained according to the ideal lens focal plane design, that is, a pixel light-emitting surface is located on a focal plane of the lens. During specific implementation, the radius of curvature of the cylindrical lens may be adjusted according to the ideal value of the radius of curvature according to actual requirements.

During specific implementation, as shown in FIG. 2, M is 3, K is 1, and n is 10.

It should be noted that M and K may have a many-to-one relationship as shown in FIG. 2. The many-to-one relationship between M and K is that M is 3, k is 1 and n is 32. Of course, M and K may also have a one-to-many or many-to-many relationship, for example, M is 3, K is 2, and n is 32; or, M is 3, K is 4 and n is 32.

Next, taking the light splitting structure as a cylindrical lens as an example, the parameter design of the light splitting structure in the display device provided by an embodiment of the present disclosure is introduced. The optimal viewing distance L1=630 mm, the pupil distance D=65 mm, and W=2D/3=43.3 mm.

During specific implementation, for example, K=1, M=3 and n=32, the display device includes 3840×2160 pixel islands, and h2=181.8 microns (μm). When the width of the M light splitting structures in the row direction is equal to the width of the K columns of pixel islands, the width of the cylindrical lens in the row direction is P1=k×h2/M. K=1 and M=3, then P1=60.6 μm. A material of the spacer dielectric layer is generally glass, and n3=1.5. L1=630 mm, W=43.3 mm, n3=1.5 and P1=60.6 μm are substituted into $$H = \frac{n3L1P1}{W}$$

to get H=1322 μm. If $n_1$=1.55, $n_2$=1.42, n3=1.5 and H=1322 μm, $$r = \frac{(n1 - n2)H}{n3} = 114.5$$

Figure 8:
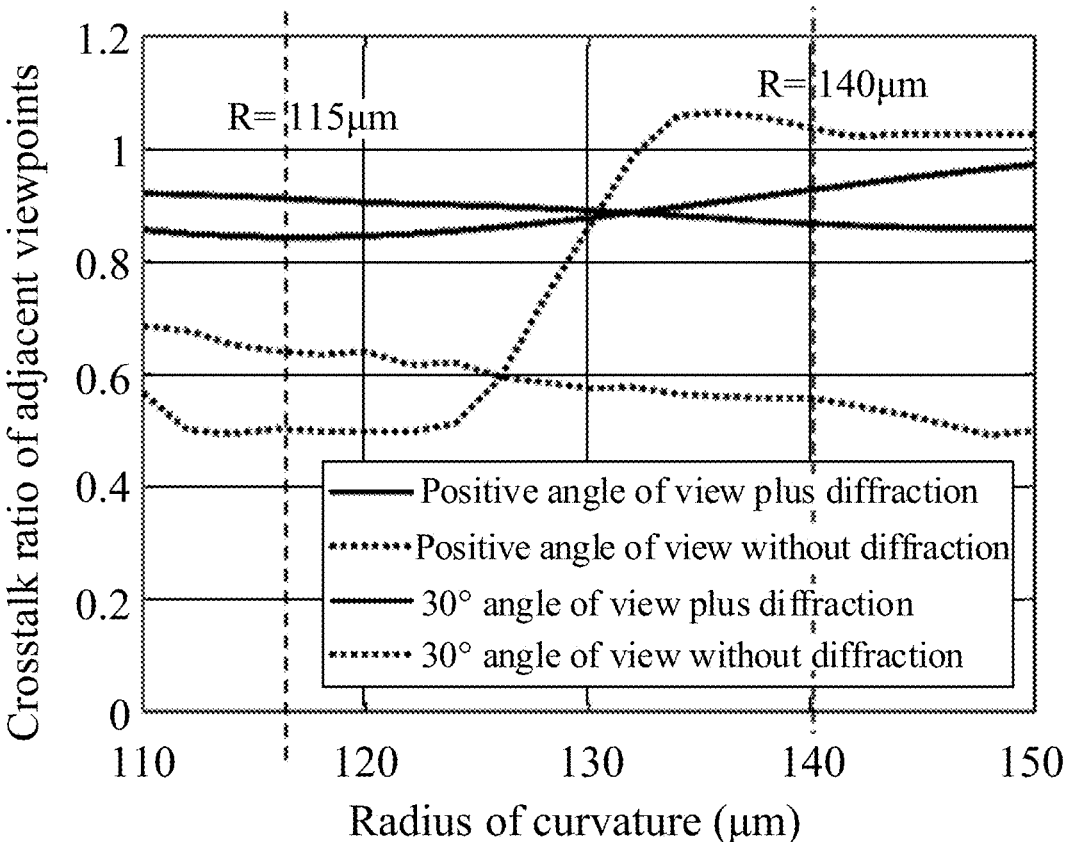
FIG. 8 is a relational diagram of crosstalk between adjacent viewpoints changing with a radius of curvature provided by an embodiment of the present disclosure.

Next, simulation results of the radius of curvature of the cylindrical lens are introduced. According to the above calculated parameters: $P_1$=60.6 μm, H=1322 μm and r=114.5 μm, and related parameters of the sub-pixels: the width of the sub-pixel in the row direction is 5.68125 μm, and the width of the sub-pixel opening in the row direction is 3.788 μm, modeling is performed, and then the radius of curvature is scanned, and the relationship of the crosstalk between adjacent viewpoints changing with the radius of curvature as shown in FIG. 8 is obtained. In order to obtain a relatively small crosstalk between the adjacent viewpoints without changing obviously with the fluctuation of the radius of curvature, and a large viewing range of zero crosstalk between left and right eyes, the radius of curvature R=116 μm is preferred in a positive angle of view; and the radius of curvature R=140 μm is preferred in a large angle of view: Moreover, according to the comparison of crosstalk data with and without diffraction, it can be seen that diffraction has little influence on crosstalk, which avoids the problem that diffraction affects crosstalk when the cylindrical lens is small in size.

During specific implementation, when the cylindrical lens is a zoom liquid crystal lens, the radius of curvature of the cylindrical lens is different at different angles of view; and the crosstalk between the adjacent viewing points is relatively small without changing obviously with the fluctuation of the radius of curvature, and the viewing range of zero crosstalk between left and right eyes is large.

Figure 9:
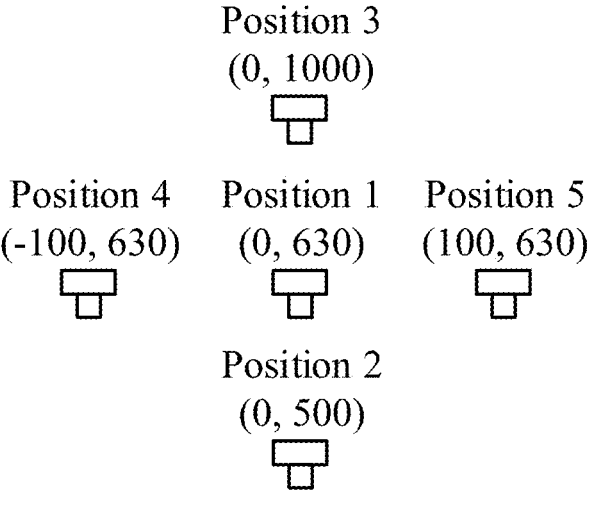
FIG. 9 is a schematic diagram of sub-pixels in different positions provided by an embodiment of the present disclosure.
Figure 10:
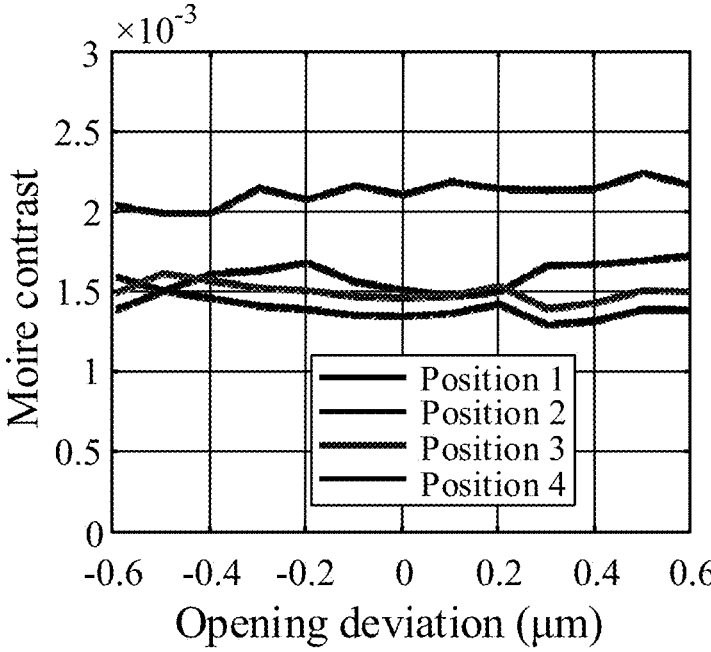
FIG. 10 is a schematic diagram of a moire contrast changing with sub-pixel opening deviation provided by an embodiment of the present disclosure.

Based on the above simulation model: $P_1$=60.6 μm, H=1322 μm and R=116 μm, and sub-pixel related parameters: the width of the sub-pixel in the row direction is 5.68125 μm, and the width of the sub-pixel opening in the row direction is 3.788 μm, the sub-pixel opening is scanned to obtain the light emitting angle spectrum of the sub-pixel at different opening positions, and different sub-pixel positions are as shown in FIG. 9. It should be noted that the aperture ratio of the sub-pixel corresponding to the simulation model is ⅔. According to the angular spectrum calculation, the fluctuation of a moire contrast with the aperture deviation of the sub-pixel as shown in FIG. 10 is obtained. It can be seen that an embodiment of the present disclosure can effectively reduce the sensitivity of moire caused by the fluctuation of pixel aperture after increasing the aperture ratio of the sub-pixel.

During specific implementation, when K=2, M=3 and n=32, for example, the display device includes 3840×2160 pixel islands, and h2=181.8 microns (μm). When the width of M light splitting structures in the row direction is equal to the width of the K columns of pixel islands, the width of the cylindrical lens in the row direction is P1=K×h2/M. K=2 and M=3, then P1=121.2 μm. A material of the spacer dielectric layer is generally glass, and n3=1.5. L1=630 mm. W=43.3 mm, n3=1.5 and P1=121.2 μm are substituted into $$H = \frac{n3 L1 P1}{W}$$

to get H=2043 μm. If $n_1$=1.55, $n_2$=1.42, n3=1.5 and H=2643 μm, $$r = \frac{(n1 - n2)H}{n3} = 229$$

μm.

Figure 11:
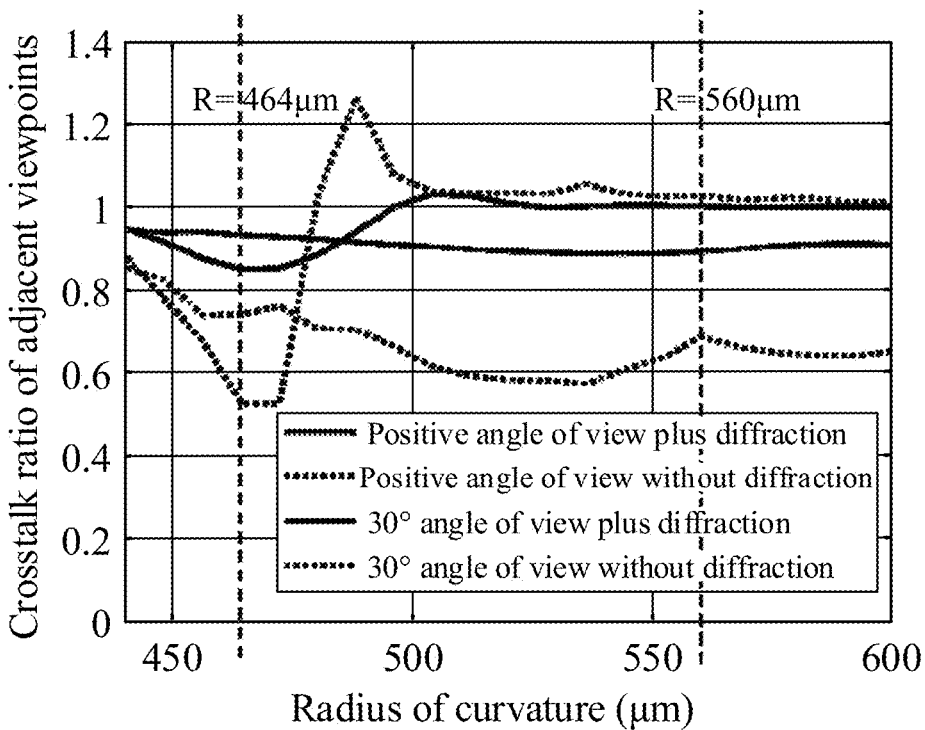
FIG. 11 is another relational diagram of crosstalk between adjacent viewpoints changing with a radius of curvature provided by an embodiment of the present disclosure.

Next, simulation results of the radius of curvature of the cylindrical lens are introduced. According to the above calculated parameters: P1=121.2 μm, H=2643 μm, and r=229 μm, and the sub-pixel related parameters: the width of the sub-pixel in the row direction is 5.68125 μm, and the width of the sub-pixel opening in the row direction is 3.788 μm, modeling is performed, then the radius of curvature is scanned, and the relationship of the crosstalk between adjacent viewpoints changing with the radius of curvature as shown in FIG. 11 is obtained. In order to obtain a relatively small crosstalk between the adjacent viewpoints without changing obviously with the fluctuation of radius of curvature, and a large viewing range of zero crosstalk between left and right eyes, the radius of curvature R=232 μm is preferred in a positive angle of view; and the radius of curvature R=280 μm is preferred in a large angle of view. Moreover, according to the comparison of crosstalk data with and without diffraction, it can be seen that the width of the cylindrical lens is increased by using two pixel islands corresponding to three cylindrical lenses in an embodiment of the present disclosure, so that the influence of diffraction on crosstalk is small, which is beneficial to the feasibility of the cylindrical lens preparation process and effectively avoids the problem that diffraction affects crosstalk when the cylindrical lens is small in size.

During specific implementation, when the cylindrical lens is a zoom liquid crystal lens, the radius of curvature of the cylindrical lens is different at different angles of view, and the crosstalk between adjacent viewing points is relatively small without changing obviously with the fluctuation of radius of curvature, and the viewing range of zero crosstalk between left and right eyes is large.

Figure 12:
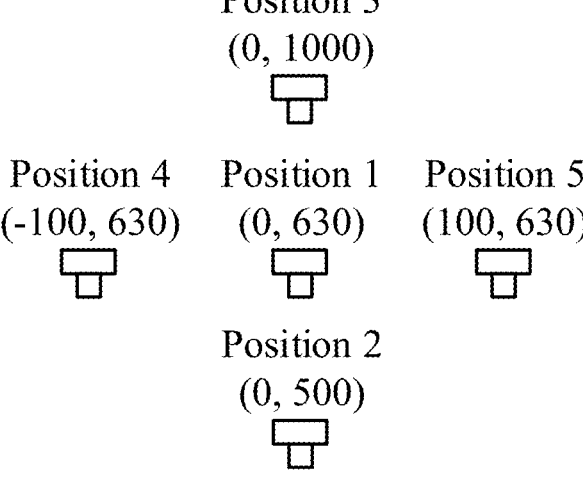
FIG. 12 is another schematic diagram of sub-pixels in different positions provided by an embodiment of the present disclosure.
Figure 13:
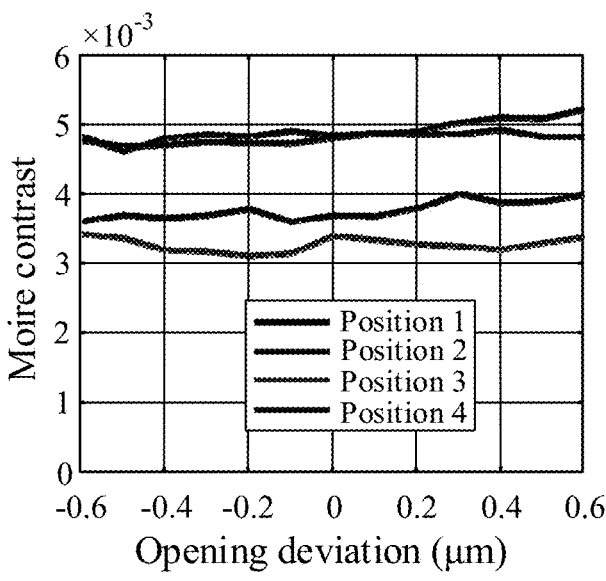
FIG. 13 is another schematic diagram of a moire contrast changing with sub-pixel opening deviation provided by an embodiment of the present disclosure.

Based on the above simulation model: P1=121.2 μm, H=2643 μm and R=232 μm, and the sub-pixel related parameters: the width of the sub-pixel in the row direction is 5.68125 μm, and the width of the sub-pixel opening in the row direction is 3.788 μm, the sub-pixel opening is scanned to obtain the light emitting angle spectrum of the sub-pixel at different opening positions, and different sub-pixel positions are as shown in FIG. 12. It should be noted that the aperture ratio of the sub-pixel corresponding to the simulation model is ⅔. According to the angular spectrum calculation, the fluctuation of a moire contrast with the aperture deviation of the sub-pixel as shown in FIG. 13 is obtained. It can be seen that an embodiment of the present disclosure can effectively reduce the sensitivity of moire caused by the fluctuation of pixel aperture after increasing the aperture ratio of the sub-pixel.

During specific implementation, when K=4, M=3 and n=32, for example, the display device includes 3840×2160 pixel islands, and h2=181.8 microns (μm). When the width of the M light splitting structures in the row direction are equal to the width of the K columns of pixel islands, the width of the cylindrical lens in the row direction is P1=k× h2/M. K=4 and M=3, then P1=242.4 μm. A material of the spacer dielectric layer is generally glass, and n3=1.5. L1=630 mm, W=43.3 mm, n3=1.5 and P1=242.4 μm are substituted into $$H = \frac{n3 L1 P1}{W}$$

to get H=>486 μm. If $n_1$=1.30, $n_2$=1.42, n3=1.5 and H=5286 μm, $$r = \frac{(n1 - n2)H}{n3} = 458$$

μm.

Figure 14:
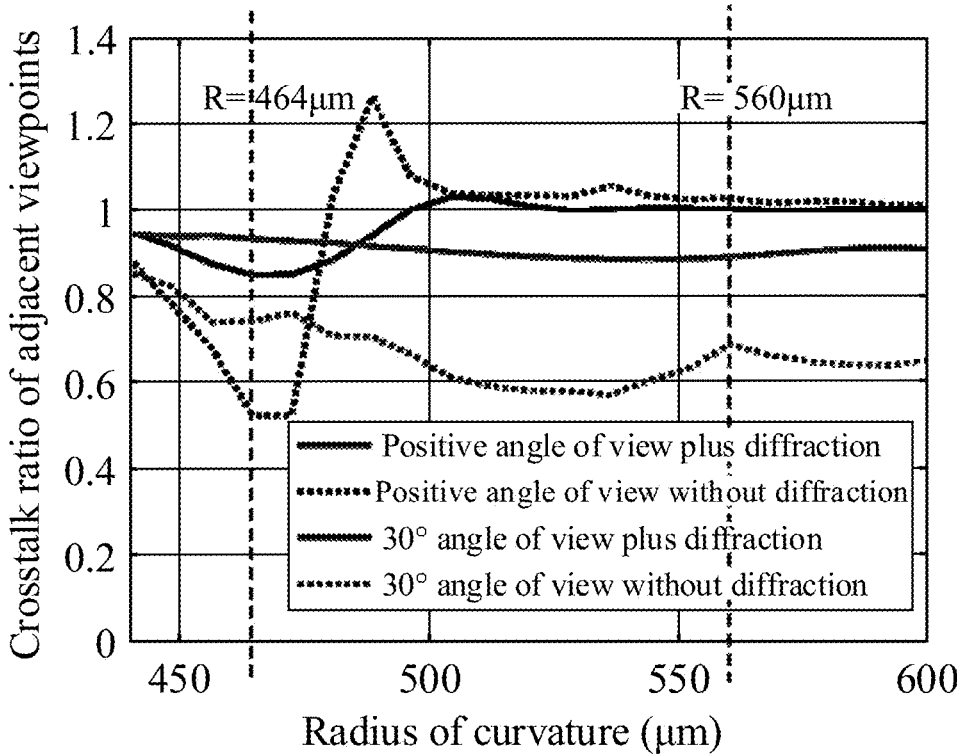
FIG. 14 is yet another relational diagram of crosstalk between adjacent viewpoints changing with a radius of curvature provided by an embodiment of the present disclosure.

Next, the simulation results of radius of curvature of the cylindrical lens are introduced. According to the above calculated parameters: P1=121.2 μm, H=5286 μm and r=458 μm, and the sub-pixel related parameters: the width of the sub-pixel in the row direction is 5.68125 μm, and the width of the sub-pixel opening in the row direction is 3.788 μm, modeling is performed, then the radius of curvature is scanned, and the relationship between the crosstalk between the adjacent viewpoints changing with the radius of curvature as shown in FIG. 14 is obtained. In order to obtain a relatively small crosstalk between the adjacent viewpoints without changing obviously with the fluctuation of radius of curvature, and a large viewing range of zero crosstalk between left and right eyes, the radius of curvature R=464 μm is preferred in a positive angle of view; and the radius of curvature R=560 μm in a large angle of view. Moreover, according to the comparison of crosstalk data with diffraction and without diffraction, it can be seen that the width of the cylindrical lens is increased by using four pixel islands corresponding to three cylindrical lenses in an embodiment of the present disclosure, so that the influence of diffraction on crosstalk is small, which is beneficial to the feasibility of the cylindrical lens preparation process and effectively avoids the problem that diffraction affects crosstalk when the cylindrical lens is small in size.

During specific implementation, when the cylindrical lens is a zoom liquid crystal lens, the radius of curvature of the cylindrical lens is different at different angles of view; and the crosstalk between the adjacent viewing points is relatively small without changing obviously with the fluctuation of radius of curvature, and the viewing range of zero crosstalk between left and right eyes is large.

Figure 15:
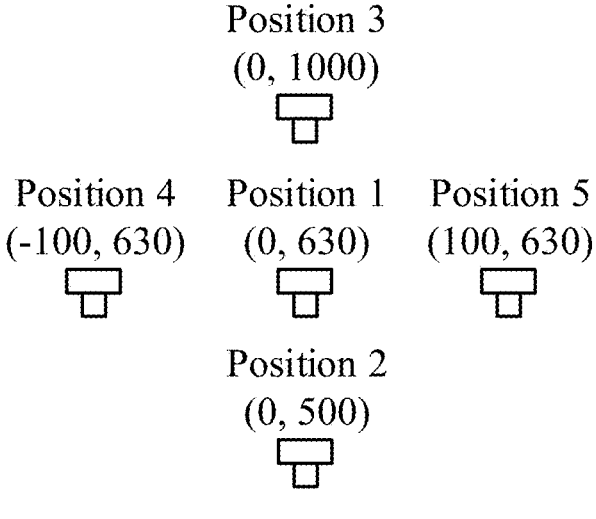
FIG. 15 is yet another schematic diagram of sub-pixels in different positions provided by an embodiment of the present disclosure.
Figure 16:
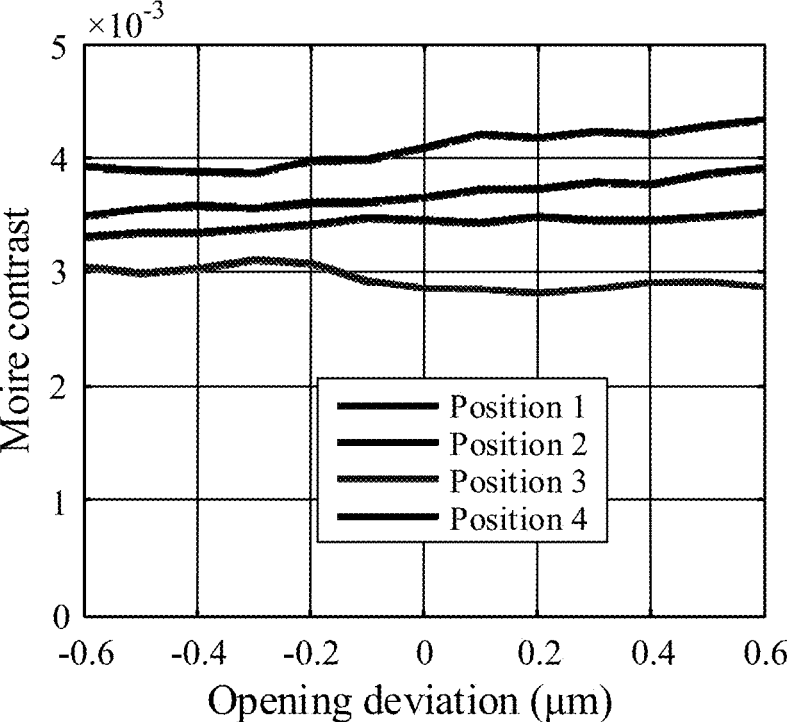
FIG. 16 is yet another schematic diagram of a moire contrast changing with sub-pixel opening deviation provided by an embodiment of the present disclosure.

Based on the above simulation model: P1=121.2 μm, H=5286 μm and R=464 μm, and the sub-pixel related parameters: the width of the sub-pixel in the row direction is 5.68125 μm, and the width of the sub-pixel opening in the row direction is 3.788 μm, the sub-pixel opening is scanned to obtain the light emitting angle spectrum of the sub-pixel at different opening positions, and different sub-pixel positions are as shown in FIG. 15. It should be noted that the aperture ratio of the sub-pixel corresponding to the simulation model is ⅔. According to the angular spectrum calculation, the fluctuation of a moire contrast with the aperture deviation of the sub-pixels as shown in FIG. 16 is obtained. It can be seen that an embodiment of the present disclosure can effectively reduce the sensitivity of moire caused by the fluctuation of pixel aperture after increasing the aperture ratio of the sub-pixel.

In some embodiments, in the row direction, an absolute value of a difference between widths of different sub-pixel opening regions is less than or equal to 2.5 microns, to avoid moire caused by large deviation of sub-pixel openings at different positions and improve the display effect.

In some embodiments, the display device further includes: an eye tracking system, configured to determine a position of user's eyes in real time.

The display device provided by an embodiment of the present disclosure may be any product or component with a display function, such as a mobile phone, a tablet computer, a television, a display, a notebook computer, a digital photo frame, a navigator, a smart watch, a fitness bracelet, a personal digital assistant and the like. Other essential components of the display device should be understood by those ordinarily skilled in the art, and will not be repeated here, nor should they be taken as limitations to the present disclosure.

Based on the same inventive concept, an embodiment of the present disclosure further provides a driving method of the above display device, as shown in FIG. 17, including following steps.

S101, a first image driving signal corresponding to each pixel island is determined according to an image to be displayed in a two-dimensional display mode, and the corresponding first image driving signal is loaded to all sub-pixels in the pixel islands to form a two-dimensional image.

S102, a gaze region and a non-gaze region of a user in the display device are determined in a three-dimensional display mode, the gaze region is driven to display an image with a first resolution and the non-gaze region is driven to display an image with a second resolution according to the image to be displayed; where the first resolution is higher than the second resolution.

It should be noted that the display device further includes a graphics processing unit (GPU), which may be used to accelerate the rendering, that is, to call the GPU to accelerate the rendering of graphics, and an image loading speed may be increased. However, due to the insufficient GPU rendering capability, the GPU rendering capability cannot meet the requirement of full view of all sub-pixel views for the display device with the pixel islands including a plurality of sub-pixels.

According to the driving method of the display device provided by an embodiment of the present disclosure, the resolution of the display panel may be controlled by partition according to a display picture, so that the gaze region of the human eyes corresponds to a high-resolution display region and the non-gaze region corresponds to a low-resolution display region, that is, the display region of the display device may be divided into a high-definition region and a low-definition region, and the resolution of the high-definition region is greater than that of the low-definition region, so that the resolution of the non-gaze region is reduced under the condition of ensuring the display effect of the gaze region of the human eyes, and the sub-pixel views are arranged within the rendering capability of the GPU.

In some embodiments, the determining a gaze region and a non-gaze region of a user in the display device includes: the gaze region of the user's eyes in the display device is acquired through an eye tracking system; and a region in the display device other than the gaze region is determined as the non-gaze region.

During specific implementation, as shown in FIG. 18, the display region of the display device is divided into Q1×Q2 zones, and the gaze region accounts for q1×q2.

Figure 19:
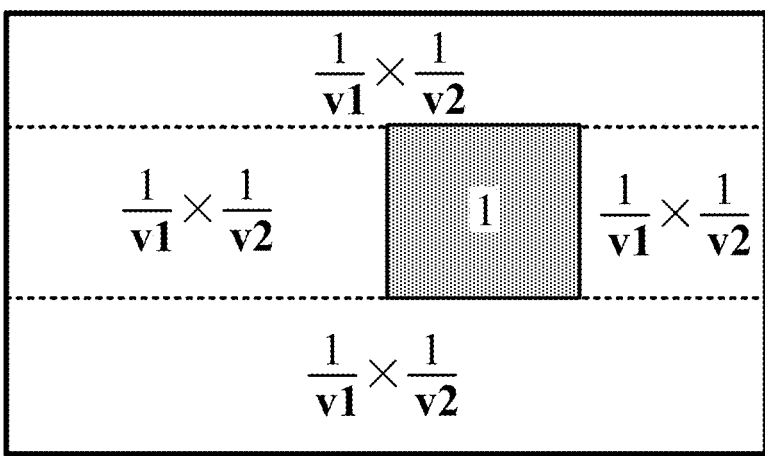
FIG. 19 is a schematic compression diagram of a resolution of a display device provided by an embodiment of the present disclosure.

It should be noted that in FIGS. 18, Q1=16 and Q2=9 are taken as an example. During specific implementation, the display device also includes a plurality of scanning lines extending in the row direction, a plurality of data lines extending in the column direction, a plurality of first driving circuits and a plurality of second driving circuits. The scanning lines are electrically connected with pixel island rows in one-to-one correspondence, and the scanning lines are electrically connected with the first driving circuits, so that scanning signals are provided to the scanning lines by the first driving circuits. The data lines are electrically connected to the sub-pixel columns in one-to-one correspondence, and the data lines are electrically connected to the second driving circuits, so that data signals are provided to the data lines by using the second driving circuits. During specific implementation, Q2 is the quantity of the first driving circuits, and Q1 is the quantity of the second driving circuits. During specific implementation, the resolution of the gaze region is not compressed, and the non-gaze region is compressed to 1/v1 in the horizontal direction and 1/v2 in the vertical direction. The resolution distribution of a compressed picture is shown in FIG. 19. In some embodiments, for example, a low-definition view of the full field of view and a high-definition view of the gaze region are rendered, and the gaze region is rendered twice in low-definition and high-definition. Suppose the data volume of each frame of full high-definition view is 100%, according to the way of rendering the low-definition view of the full field of view and the high-definition view of the gaze region, the data volume of each frame of picture becomes:

$$\frac{q1}{Q1} \times \frac{q2}{Q2} + \frac{1}{v1} \times \frac{1}{v2}.$$

When both the horizontal and vertical directions are compressed by ¼, namely, $$\frac{1}{v1} = \frac{1}{v2} = \frac{1}{4},$$

the data compression ratio as shown in Table 1 is obtained for different values of q1 and q2. During specific implementation, the values of q1 and q2 can be determined according to the required data compression ratio. For example, when the data needs to be compressed to 25%, the compression ratio of ¼×¼ may be selected, and the gaze region may be 5×5 zones, namely, q1=q2=5; alternatively, the gaze region may be 4×6 zones, namely, q1=4 and q2-6. The area of the gaze region accounts for about 17% of the area of the total display region.

TABLE 1

| q1 | | | | | | | | q2 | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 7% | 8% | 9% | 10% | 10% | 11% | 12% | 12% | 13% | 14% | 14% | 15% | 16% | 16% | 17% | 13% |
| 2 | 8% | 10% | 11% | 12% | 14% | 15% | 16% | 18% | 19% | 21% | 22% | 23% | 25% | 26% | 28% | 29% |
| 3 | 9% | 11% | 13% | 15% | 17% | 19% | 21% | 23% | 25% | 28% | 30% | 32% | 34% | 36% | 38% | 40% |
| 4 | 9% | 12% | 15% | 18% | 21% | 23% | 26% | 29% | 32% | 35% | 37% | 40% | 43% | 46% | 48% | 51% |
| 5 | 10% | 14% | 17% | 21% | 24% | 28% | 31% | 35% | 40% | 41% | 45% | 48% | 52% | 55% | 59% | 62% |
| 6 | 11% | 15% | 19% | 23% | 28% | 32% | 36% | 40% | 46% | 48% | 53% | 57% | 61% | 65% | 69% | 73% |
| 7 | 12% | 16% | 21% | 26% | 31% | 36% | 41% | 46% | 51% | 55% | 60% | 65% | 70% | 75% | 80% | 85% |
| 8 | 12% | 18% | 23% | 29% | 35% | 40% | 46% | 51% | 57% | 62% | 68% | 73% | 79% | 85% | 90% | 96% |
| 9 | 13% | 19% | 25% | 32% | 38% | 44% | 50% | 57% | 63% | 69% | 75% | 82% | 88% | 94% | 100% | 107% |

It should be noted that the non-gaze region is compressed by ¼ in both the horizontal and vertical directions, that is, the 4×4 pixel islands are compressed into 1 pixel island data. During specific implementation, for example, the data of one pixel island in 4×4 pixel islands is copied to three adjacent pixel islands and four rows of pixel islands are turned on at the same time, so that the data of the 4×4 pixel islands in the non-gaze region are written into the same pixel island.

It should be noted that during specific implementation, the low-definition view of the non-gaze region and the high-definition view of the gaze region may also be rendered.

In some embodiments, step S102 that the gaze region is driven to display the image with the first resolution, and the non-gaze region is driven to display the image with the second resolution according to the image to be displayed includes following steps.

Coordinates of the user's eyes are determined through the eye tracking system, and a left eye view and a right eye view are determined according to the coordinates of the user's eyes.

A plurality of first resolution images corresponding to the first resolution and a plurality of second resolution images corresponding to the second resolution are rendered according to the left-eye view and the right-eye view.

Sub-pixels corresponding to the left eye view and sub-pixels corresponding to the right eye view in each pixel island group are determined, where each pixel island group includes K pixel islands correspondingly covered by a light splitting repeating unit, and a direction of a connecting line of left and right eyes of the user is parallel to the row direction.

A driving signal corresponding to the left eye view is provided to the sub-pixels corresponding to the left eye view; and a driving signal corresponding to the right eye view is provided to the sub-pixels corresponding to the right eye view; according to the second resolution images in the non-gaze region; and a driving signal corresponding to the left eye view is provided to the sub-pixels corresponding to the left eye view; and a driving signal corresponding to the right eye view is provided to the sub-pixels corresponding to the right eye view; according to the first resolution images in the gaze region.

It should be noted that in some embodiments, the first resolution image is only an image corresponding to the gaze region, and the second resolution image is an image corresponding to the gaze region and the non-gaze region. Firstly, according to the second resolution image, the driving signal corresponding to the left eye view is provided to the sub-pixels corresponding to the left eye view in the gaze region and the non-gaze region, and the driving signal corresponding to the right eye view is provided to the sub-pixels corresponding to the right eye view in the gaze region and the non-gaze region. Then, according to the first resolution image, the driving signal corresponding to the left eye view is provided to the sub-pixels corresponding to the left eye view in the gaze region, and the driving signal corresponding to the right eye view is provided to the sub-pixels corresponding to the right eye view in the gaze region, to finally realize: in the non-gaze region, according to the second resolution image, the driving signal corresponding to the left eye view is provided to the sub-pixels corresponding to the left eye view; and the driving signal corresponding to the right eye view is provided to the sub-pixel corresponding to the right eye view; and in the gaze region, according to the first resolution image, the drive signal corresponding to the left eye view is provided to the sub-pixel corresponding to the left eye view; and the drive signal corresponding to the right eye view is provided to the sub-pixel corresponding to the right eye view. Alternatively, in some embodiments, the first resolution image is only the image corresponding to the gaze region, and the second resolution image is the image corresponding to the non-gaze region. Firstly, according to the second resolution image, the driving signal corresponding to the left eye view is provided to the sub-pixels corresponding to the left eye view in the non-gaze region, and the driving signal corresponding to the right eye view is provided to the sub-pixels corresponding to the right eye view in the non-gaze region. Then, according to the first resolution image, the driving signal corresponding to the left eye view is provided to the sub-pixels corresponding to the left eye view in the gaze region, and the driving signal corresponding to the right eye view is provided to the sub-pixels corresponding to the right eye view in the gaze region, to finally realize: in the non-gaze region, according to the second resolution image, the driving signal corresponding to the left eye view is provided to the sub-pixel corresponding to the left eye view; and the driving signal corresponding to the right eye view is provided to the sub-pixel corresponding to the right eye view; and in the gaze region, according to the first resolution image, the driving signal corresponding to the left eye view is provided to the sub-pixel corresponding to the left eye view; and the driving signal corresponding to the right eye view is provided to the sub-pixel corresponding to the right eye view:

It should be noted that each pixel island group includes K pixel islands covered by a light splitting repeating unit, that is, the total quantity of the sub-pixels included in each pixel island group is N=K×n.

In some embodiments, N=K×n is an even number: the eye tracking system includes: N/2 first cameras and N/2 second cameras; and the determining coordinates of the user's eyes through the eye tracking system, and determining the left eye view and the right eye view according to the coordinates of the user's eyes includes following steps.

Central coordinates of the user's eyes and a central viewpoint corresponding to the central coordinates are determined.

(N−1) first viewpoints are set in a region corresponding to the user's left eye according to a preset viewpoint interval from the central viewpoint, and N second viewpoints are set in a region corresponding to the user's right eye according to the preset viewpoint interval from the central viewpoint.

N/2 first cameras are respectively set at the $(N/2)^{th}$ first viewpoint to the $(N−1)^{th}$ first viewpoint, and N/2 second cameras are respectively set at the $[(N/2)+1]^{th}$ second viewpoint to the $N^{th}$ second viewpoint, the left eye view is obtained by using the N/2 first cameras, and the right eye view is obtained by using the N/2 second cameras.

It should be noted that the preset viewpoint interval is set according to the projection width of N viewpoints at the optimal viewing distance. For example, when W=2D/3, that is, the projection width of the main lobe angle of view formed by the light emitted by the N sub-pixels at the optimal viewing distance of the display device is equal to ⅔ of the pupil distance, and the projection width of N viewpoints at the distance of 630 mm is 43.3 mm. When N=32, the preset viewpoint interval is 0.12°; when N=64, the preset viewpoint interval is 0.06°; and when N=128, the preset viewpoint interval is 0.03°. When the projection width of the main lobe angle of view formed by the light emitted by the N sub-pixels at the optimal viewing distance of the display device is equal to ⅔ of the pupil distance, a difference between the viewpoints of the left and right eye is 3N/2.

In the driving method of the display device provided by an embodiment of the present disclosure, the preset viewpoint interval is set according to the projection width of the N viewpoints at the optimal viewing distance, the sum of the central viewpoint, the first viewpoints and the second viewpoints is 2N, and the difference between the $(N−1)^{th}$ first viewpoint and the $[(N/2)+1]^{th}$ second viewpoint is 3N/2 viewpoints. Setting viewpoints according to the preset viewpoint interval, and according to a camera placement mode provided by an embodiment of the present disclosure, not only can the viewpoint density of a single eye be ensured, but also the correct parallax of double eyes can be ensured. Under the condition of solving visual fatigue, the sub-pixel view is arranged within the rendering capability of the GPU.

In some embodiments, step S1023 that the sub-pixels corresponding to the left eye view and the sub-pixels corresponding to the right eye view in each pixel island group are determined includes: a light-emitting angular spectrum of each sub-pixel is acquired to obtain an angular spectrum boundary database; coordinates of a center of the user's eyes are determined according to the coordinates of the user's eyes: an included angle between the center of the user's eyes and a center of each pixel island group is determined; and according to the included angle between the center of the user's eyes and the center of each pixel island group and the light-emitting angle spectrum of each sub-pixel, a central sub-pixel corresponding to the center of the user's eyes is determined.

If the coordinates of the center of the user's eyes are in a left half of the central sub-pixel, the central sub-pixel and (N/2)−1 sub-pixels on a right side of the central sub-pixel correspond to the right eye view; and the N/2 sub-pixels on a left side of the central sub-pixel correspond to the left eye view.

If the coordinates of the center of the user's eyes are in a right half of the central sub-pixel, the N/2 sub-pixels on the right side of the central sub-pixel correspond to the right eye view, and the central sub-pixel and the (N/2)−1 sub-pixels on the left side of the central sub-pixel correspond to the left eye view:

During specific implementation, for example, the light-emitting angular spectrum of each sub-pixel may be measured in advance through simulation, and the display device further includes a driving chip for storing the light-emitting angular spectrum, so that the stored light-emitting angular spectrum of each sub-pixel may be obtained through the driving chip. Alternatively, the display device may further include a module for measuring the light-emitting angular spectrum of each sub-pixel, and the light-emitting angular spectrum of the sub-pixel may be measured in real time through this module.

During specific implementation, when the width of the M light splitting structures in the row direction is equal to the width of the K columns of pixel islands, light-emitting angular spectra of sub-pixels in the pixel islands are identical. An angular spectrum boundary of each sub-pixel is determined according to the obtained light-emitting angular spectrum of each sub-pixel, and an angular range occupied by each sub-pixel is determined using an intersection point of light-emitting angular spectra of adjacent sub-pixels as a boundary point. During specific implementation, a relationship between all boundary points and corresponding sub-pixel serial numbers may be stored as an angular spectrum boundary database of sub-pixels, for example, the angular spectrum boundary database may be stored in the driving chip. According to the included angle in the row direction of the connecting line of the center of user's eyes and the center of each pixel island group and the light-emitting angular spectrum of each sub-pixel, the central sub-pixel corresponding to the center of user's eyes is determined. The included angle of the connecting line of the center of user's eyes and the center of each pixel island group is compared with the angular spectrum boundary database of sub-pixels to determine the center of user's eyes is located in an angular spectrum range of which sub-pixel for each pixel island group, and the sub-pixel may be taken as the central sub-pixel of the pixel island group.

Next, the driving method of the display device provided by an embodiment of the present disclosure will be described by taking the resolution compression ¼×¼ of the non-gaze region with W=2D/3 as an example.

In some embodiments K=1, M=3 and N=n=32.

Figure 20:
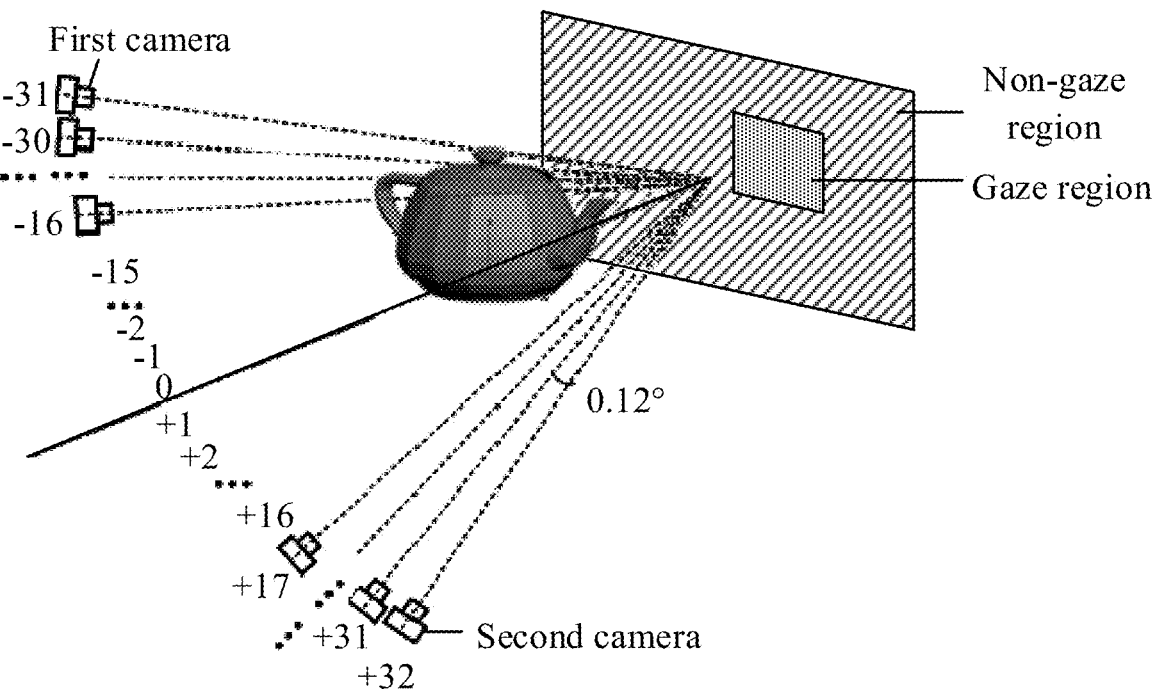
FIG. 20 is a schematic diagram of viewpoint distribution and camera arrangement provided by an embodiment of the present disclosure.

As shown in FIG. 20, 31 first viewpoints are set in the region corresponding to the user's left eye according to a preset viewpoint interval of 0.12° from the central viewpoint, and 32 second viewpoints are set in the region corresponding to the user's right eye according to the preset viewpoint interval from the central viewpoint. In FIG. 20, a reference sign of the first viewpoints is −, and a reference sign of the second viewpoints is +, that is, −31 represents the $31^{st}$ first viewpoint and +32 represents the $32^{nd}$ second viewpoint. 16 first cameras are set at positions of −16 to −31, and 16 second cameras are set at the positions of +17 to +32 respectively. The 16 first cameras are used to obtain a left eye view corresponding to the left eye view; and the 16 second cameras are used to obtain a right eye view corresponding to right eye view. According to the second resolution of 960×540, 32 pictures with full field of view are rendered, and according to the density of the first resolution of 3840×2160, 32 pictures with field of view of gaze region are rendered.

Figure 21:
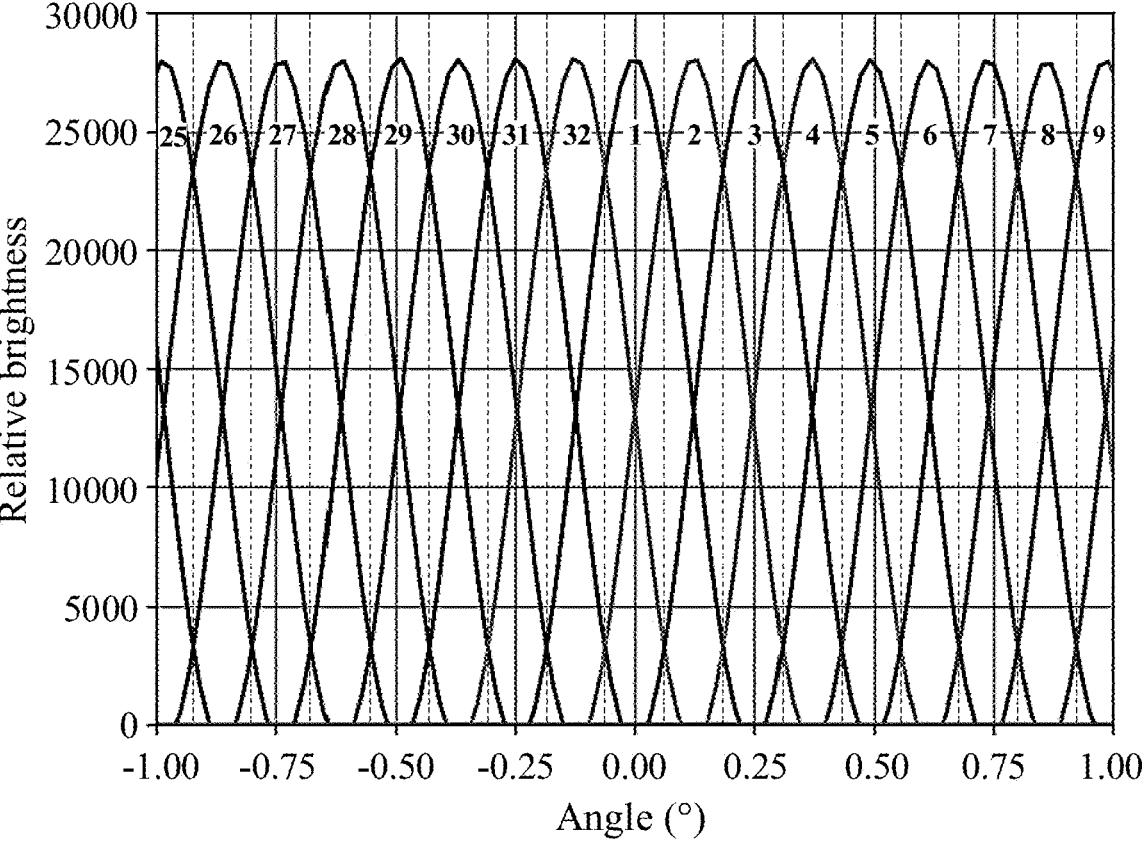
FIG. 21 is a schematic boundary diagram of a sub-pixel angular spectrum provided by an embodiment of the present disclosure.
Figure 22:
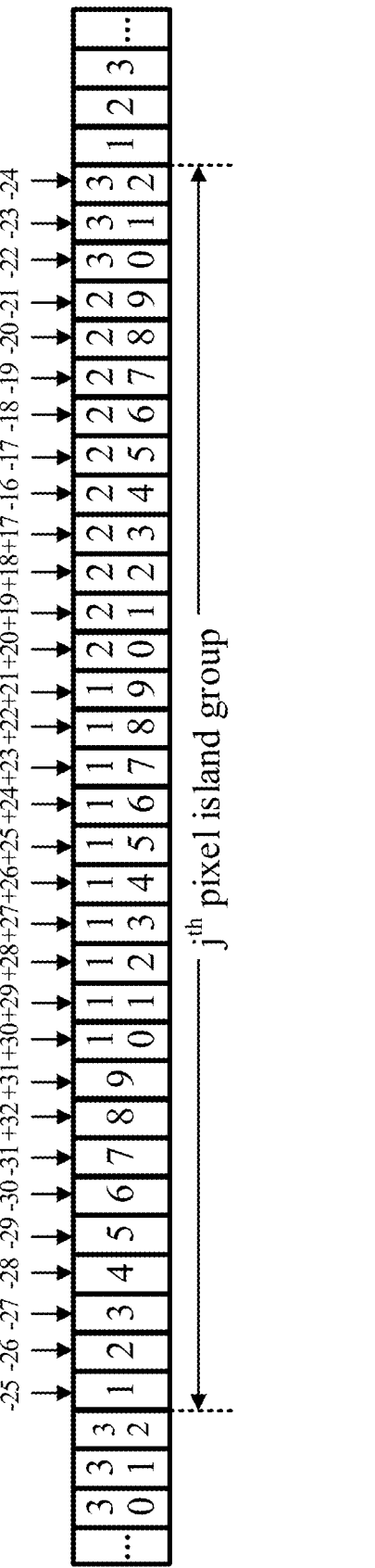
FIG. 22 is a schematic diagram of sub-pixels corresponding to a left eye view and a right eye view provided by an embodiment of the present disclosure.
Figure 23:
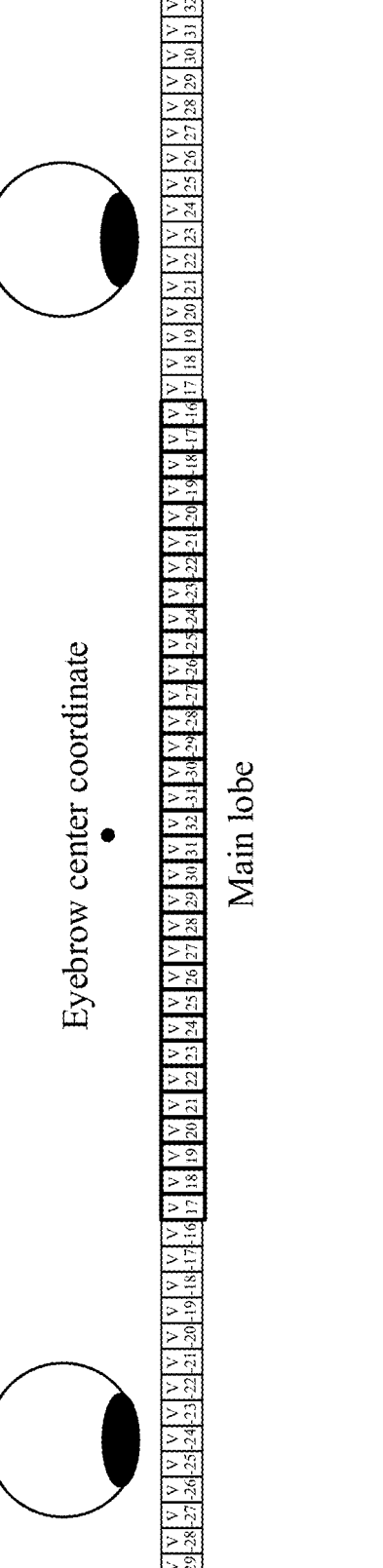
FIG. 23 is a schematic diagram of a view effect observed by human eyes provided by an embodiment of the present disclosure.

As shown in FIG. 21, the obtained light-emitting angular spectrum of each sub-pixel is used to determine the angular spectrum boundary of each sub-pixel, and the angle range occupied by each sub-pixel is determined by taking the intersection point of light-emitting angular spectra of adjacent sub-pixels as the boundary point. FIG. 21 only shows angular spectrum boundaries of part of sub-pixels. During specific implementation, the relationship between all boundary points and corresponding sub-pixel serial numbers may be stored as an angular spectrum boundary database of sub-pixels, for example, the angular spectrum boundary database may be stored in a driving chip. According to the included angle in the row direction of the connecting line of the center of user's eyes and the center of each pixel island group and the light-emitting angular spectrum of each sub-pixel, the central sub-pixel corresponding to the center of user's eyes may be determined. The included angle of the connecting line of the center of user's eyes and the center of each pixel island group is compared with the angular spectrum boundary database of sub-pixels to determine the center of user's eyes is located in an angular spectrum range of which sub-pixel for each pixel island group, and the sub-pixel may be taken as the central sub-pixel of the pixel island group. For example, the center of the user's eyes corresponds to the eighth sub-pixel of the $j^{th}$ pixel island group, so the eighth sub-pixel is taken as the central sub-pixel of the $j^{th}$ pixel island group. It should be noted that when determining the central sub-pixel, as shown in FIG. 22, the sub-pixels are spliced according to the viewpoint order, and the sub-pixels are arranged according to the order of viewpoints from small to large, the central sub-pixel and the sub-pixels corresponding to the left eye view and the right eye view respectively are determined according to the sub-pixel positions in the viewpoint arrangement order. As shown in FIG. 22, when the central coordinates of the user's eyes fall on the left half of the eighth sub-pixel of the $j^{th}$ pixel island group, the eighth sub-pixel and 15 sub-pixels on the right side of the eighth sub-pixel included in the pixel island group sequentially correspond to the $+32^{nd}$ to $+17$th second viewpoints, and 16 sub-pixels on the left side of the eighth sub-pixel sequentially correspond to the $-31^{st}$ to $-16$th first viewpoints. The second resolution image data of each viewpoint is loaded onto the pixel island group of 3840×2160 according to the resolution of 960×540, and then images of the gaze region are replaced to corresponding positions, to obtain 32 images with the resolution of 3840×2160 for respective viewpoints. Then, according to the corresponding relationship between sub-pixels and viewpoints in each pixel island group, 32 pictures of 3840×2160 are arranged alternately to form a picture of (3840×32)×2160, which is assigned to each sub-pixel, thus completing 3D layout. After the above-mentioned layout processing, the human eyes may see the view effect as shown in FIG. 23, and on the basis of ensuring the correct parallax of the left and right eyes, a plurality of different parallax images entering the pupil may further be realized, thus solving the problem of 3D visual fatigue.

Figure 24:
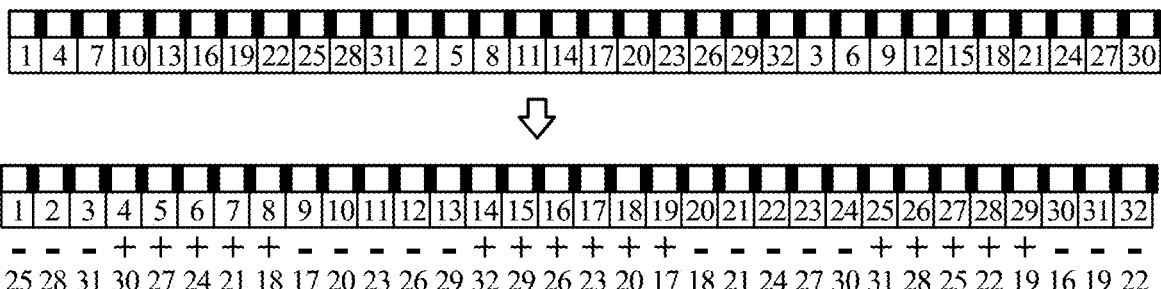
FIG. 24 is a schematic diagram of conversion between an actual corresponding viewpoint number and an actual physical arrangement number of a sub-pixel in a pixel island provided by an embodiment of the present disclosure.

It should be noted that in FIG. 22, the sub-pixels are spliced according to the order of viewpoints. During specific implementation, the order of viewpoints from small to large does not represent actual positions of sub-pixels in each pixel island group. As shown in FIG. 24, during actual layout, conversion should be performed between the actual corresponding viewpoint number of the sub-pixels in the pixel island and the actual physical arrangement number. For example, the difference between the viewpoints of two adjacent sub-pixels corresponding to the light splitting structure may be set as M.

In some embodiments, K=2, M=3, n=32 and N=64.

Figure 25:
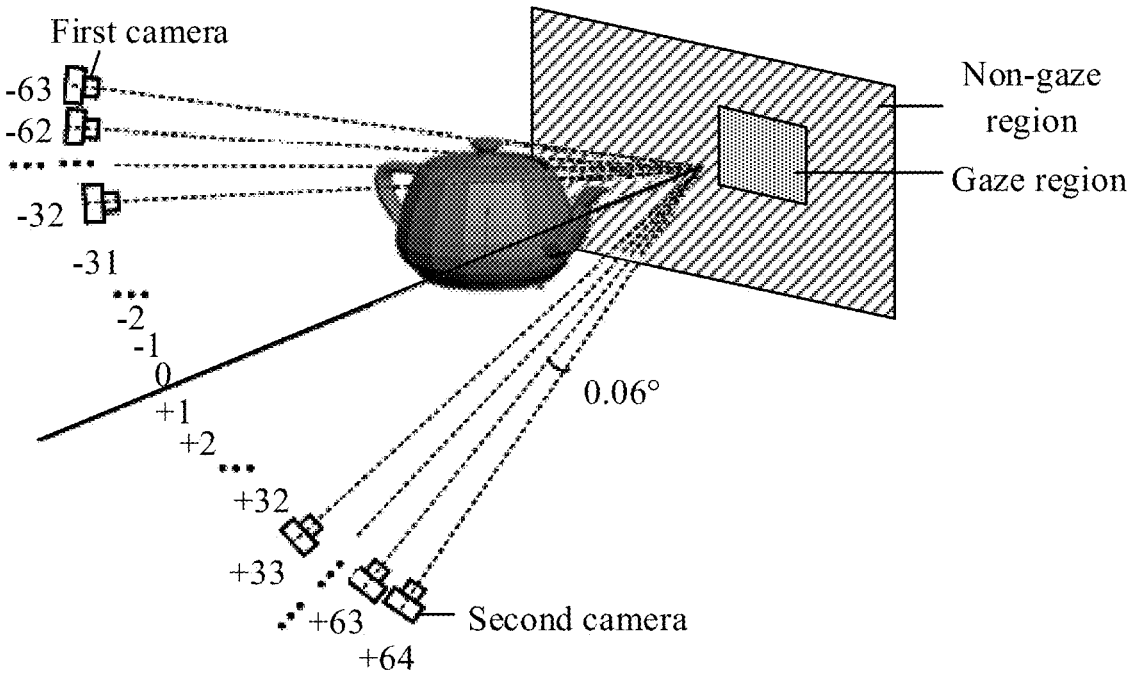
FIG. 25 is another schematic diagram of viewpoint distribution and camera arrangement provided by an embodiment of the present disclosure.

As shown in FIG. 25, 63 first viewpoints are set in the region corresponding to the user's left eye according to a preset viewpoint interval of 0.06° from the central viewpoint, and 64 second viewpoints are set in the region corresponding to the user's right eye according to the preset viewpoint interval from the central viewpoint. 32 first cameras are set at positions of −32 to −63, and 32 second cameras are set at positions of +33 to +64 respectively. The 32 first cameras are used to obtain a left eye view; and the 32 second cameras are used to obtain a right eye view corresponding to the right eye view. According to the second resolution of 480×540, 64 pictures with full field of view are rendered, and according to the density of the first resolution of 1920×2160, 64 pictures with field of view of gaze region are rendered.

Figure 26:
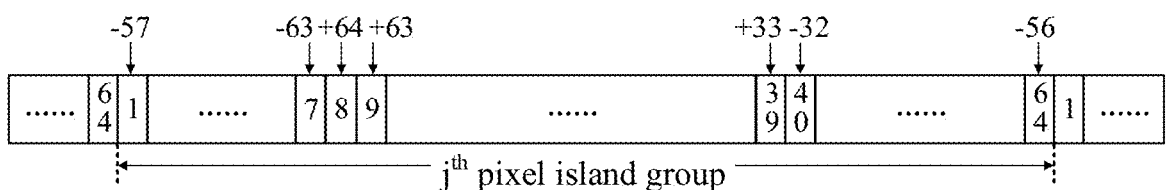
FIG. 26 is another schematic diagram of sub-pixels corresponding to a left eye view and a right eye view provided by an embodiment of the present disclosure.
Figure 27:
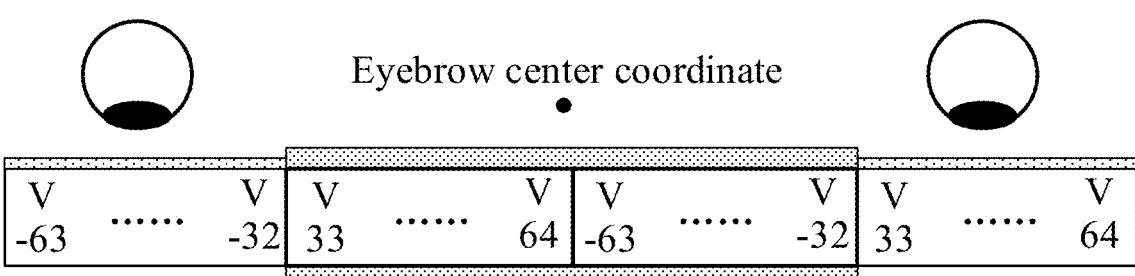
FIG. 27 is another schematic diagram of a view effect observed by human eyes provided by an embodiment of the present disclosure.

The light-emitting angular spectrum of each sub-pixel is obtained, the angular spectrum boundary of each sub-pixel is determined according to the obtained light-emitting angular spectrum of each sub-pixel, and the angular range occupied by each sub-pixel is determined by taking the intersection point of the light-emitting angular spectra of adjacent sub-pixels as the boundary point. According to the included angle in the row direction of the connecting line of the center of user's eyes and the center of each pixel island group and the light-emitting angular spectrum of each sub-pixel, the central sub-pixel corresponding to the center of user's eyes may be determined. The included angle of the connecting line of the center of user's eyes and the center of each pixel island group is compared with the angular spectrum boundary database of sub-pixels to determine the center of user's eyes is located in an angular spectrum range of which sub-pixel for each pixel island group, and the sub-pixel may be taken as the central sub-pixel of the pixel island group. For example, the center of the user's eyes corresponds to the eighth sub-pixel of the $j^{th}$ pixel island group, so the eighth sub-pixel is taken as the central sub-pixel of the $j^{th}$ pixel island group. It should be noted that when determining the central sub-pixel, as shown in FIG. 26, the sub-pixels are spliced according to the viewpoint order, and the sub-pixels are arranged according to the order of viewpoints from small to large, the central sub-pixel and the sub-pixels corresponding to the left eye view and the right eye view respectively are determined according to the sub-pixel positions in the viewpoint arrangement order. As shown in FIG. 26, when the central coordinates of the user's eyes fall on the left half of the eighth sub-pixel of the $j^{th}$ pixel island group, the eighth sub-pixel and the 31 sub-pixels on the right side of the eighth sub-pixel included in the pixel island group sequentially correspond to the $+64^{th}$ to $+33^{rd}$ second viewpoints, and the 32 sub-pixels on the left side of the eighth sub-pixel sequentially corresponds to the $-63^{rd}$ to $-32^{nd}$ first viewpoints. The second resolution image data of each viewpoint is loaded onto the pixel island group of 1920×2160 according to the resolution of 480×540, and then images of the gaze region are replaced to corresponding positions, to obtain 64 images with the resolution of 1920× 2160 for respective viewpoints. Then, according to the corresponding relationship between sub-pixels and viewpoints in each pixel island group, 64 pictures of 3840×2160 are arranged alternately to form a picture of (1920×64)× 2160, which is assigned to each sub-pixel, thus completing 3D layout. After the above-mentioned layout processing, the human eyes may see the view effect as shown in FIG. 27, and on the basis of ensuring the correct parallax of the left and right eyes, a plurality of different parallax images entering the pupil may be realized, thus solving the problem of 3D visual fatigue.

Figure 28:
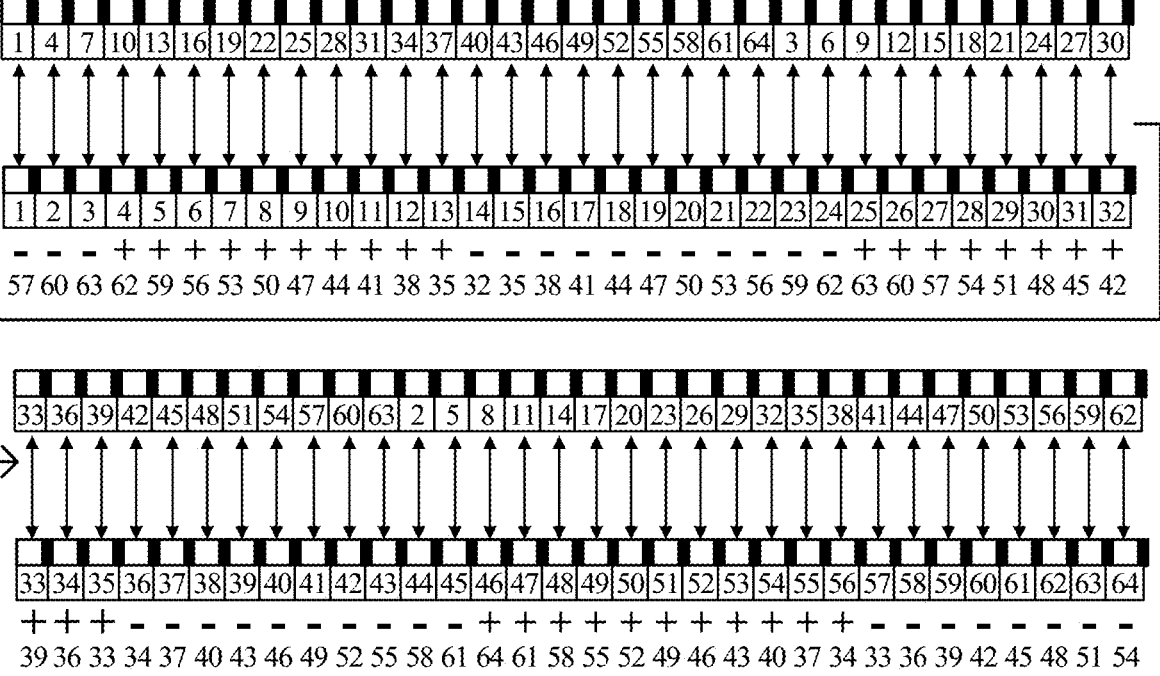
FIG. 28 is a schematic diagram of conversion between an actual corresponding viewpoint number and an actual physical arrangement number of a sub-pixel in a pixel island provided by an embodiment of the present disclosure.

It should be noted that in FIG. 26, the sub-pixels are spliced according to the order of viewpoints. During specific implementation, the order of viewpoints from small to large does not represent the actual position of sub-pixels in each pixel island group. As shown in FIG. 28, during actual layout, conversion should be performed between the actual corresponding viewpoint number of sub-pixels in the pixel island and the actual physical arrangement number. For example, the difference between the viewpoints of two adjacent sub-pixels corresponding to the light splitting structure may be set as M.

In some embodiments, K=4, M=3, n=32 and N=128.

Figure 29:
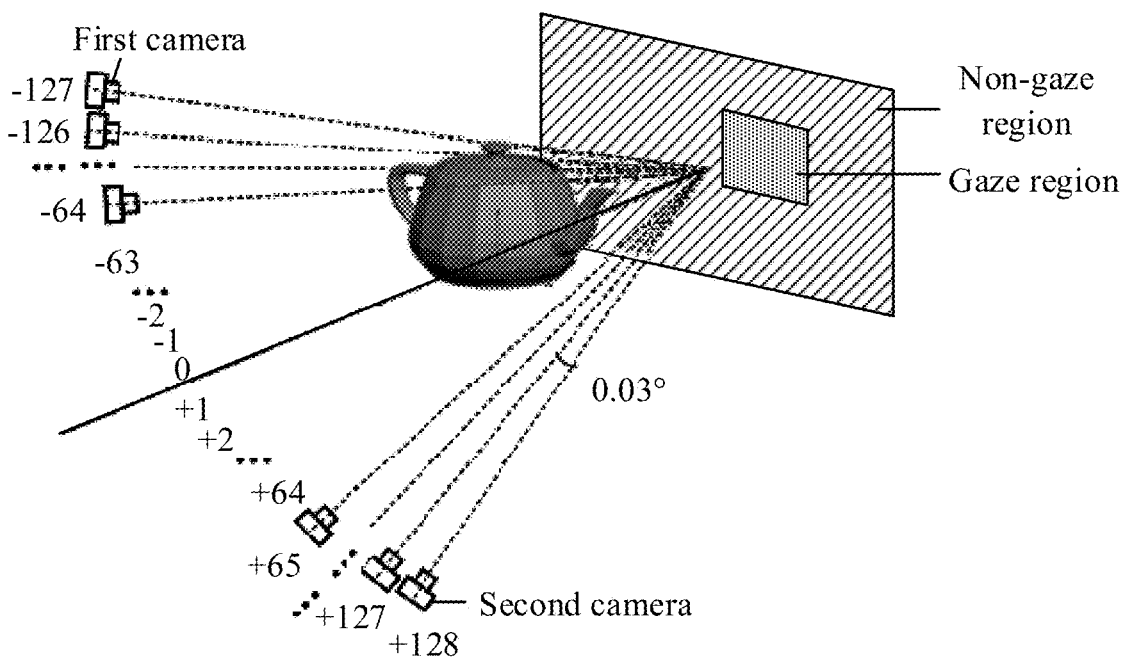
FIG. 29 is yet another schematic diagram of viewpoint distribution and camera arrangement provided by an embodiment of the present disclosure.

As shown in FIG. 29, 127 first viewpoints are set in the region corresponding to the user's left eye according to a preset viewpoint interval of 0.03° from the central viewpoint, and 128 second viewpoints are set in the region corresponding to the user's right eye according to the preset viewpoint interval from the central viewpoint. 64 first cameras are set at the positions of −64 to −127, and 64 second cameras are set at the positions of +65 to +128 respectively. The 64 first cameras are used to obtain a left eye view, and the 64 second cameras are used to obtain a right eye view corresponding to the right eye view. According to the second resolution of 240×540, 128 pictures with full field of view are rendered, and according to the density of the first resolution of 960×2160, 128 pictures with field of view of gaze region are rendered.

Figure 30:
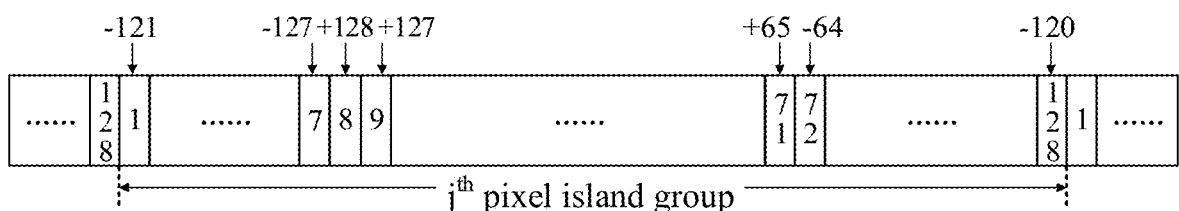
FIG. 30 is yet another schematic diagram of sub-pixels corresponding to a left eye view and a right eye view provided by an embodiment of the present disclosure.
Figure 31:
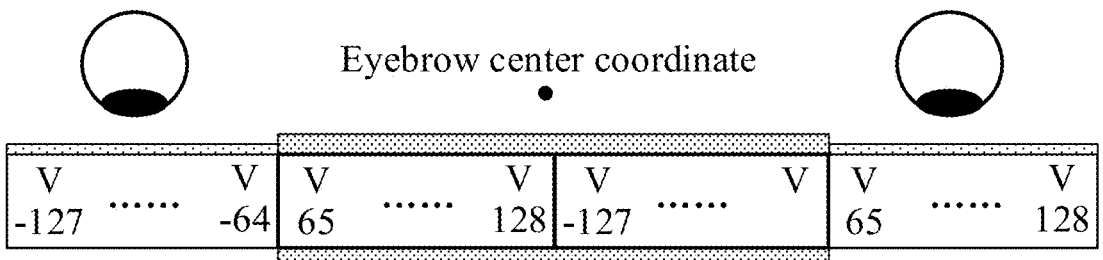
FIG. 31 is yet another schematic diagram of a view effect observed by human eyes provided by an embodiment of the present disclosure.

The light-emitting angular spectrum of each sub-pixel is obtained, the angular spectrum boundary of each sub-pixel is determined according to the obtained light-emitting angular spectrum of each sub-pixel, and the angular range occupied by each sub-pixel is determined by taking the intersection point of the light-emitting angular spectra of adjacent sub-pixels as the boundary point. According to the included angle in the row direction of the connecting line of the center of user's eyes and the center of each pixel island group and the light-emitting angular spectrum of each sub-pixel, the central sub-pixel corresponding to the center of user's eyes may be determined. The included angle of the connecting line of the center of user's eyes and the center of each pixel island group is compared with the angular spectrum boundary database of sub-pixels to determine the center of user's eyes is located in an angular spectrum range of which sub-pixel for each pixel island group, and the sub-pixel may be taken as the central sub-pixel of the pixel island group. For example, the center of the user's eyes corresponds to the eighth sub-pixel of the $j^{th}$ pixel island group, so the eighth sub-pixel is taken as the central sub-pixel of the $j^{th}$ pixel island group. It should be noted that when determining the central sub-pixel, as shown in FIG. 30, the sub-pixels are spliced according to the viewpoint order, and the sub-pixels are arranged according to the order of viewpoints from small to large, the central sub-pixel and the sub-pixels corresponding to the left eye view and the right eye view respectively are determined according to the sub-pixel positions in the viewpoint arrangement order. As shown in FIG. 30, when the central coordinates of the user's eyes fall on the left half of the eighth sub-pixel of the $j^{th}$ pixel island group, the eighth sub-pixel and the 63 sub-pixels on the right side of the eighth sub-pixel included in the pixel island group correspond to the $+128^{th}$ to $+65^{th}$ second viewpoints sequentially, and the 64 sub-pixels on the left side of the eighth sub-pixel correspond to the $-127^{th}$ to $-64^{th}$ first viewpoints sequentially. The second resolution image data of each viewpoint is loaded onto the pixel island group of 960×2160 according to the resolution of 240×540, and then images of the gaze region are replaced to corresponding positions, to obtain 128 images with the resolution of 960×2160 for respective viewpoints. Then, according to the corresponding relationship between sub-pixels and viewpoints in each pixel island group. 128 pictures of 960×2160 are arranged alternately to form a picture of (960×128)×2160, which is assigned to each sub-pixel, thus completing 3D layout. After the above-mentioned layout processing, the human eyes may see the view effect as shown in FIG. 31, and on the basis of ensuring the correct parallax of the left and right eyes, a plurality of different parallax images entering the pupil may be realized, thus solving the problem of 3D visual fatigue.

Figure 32:
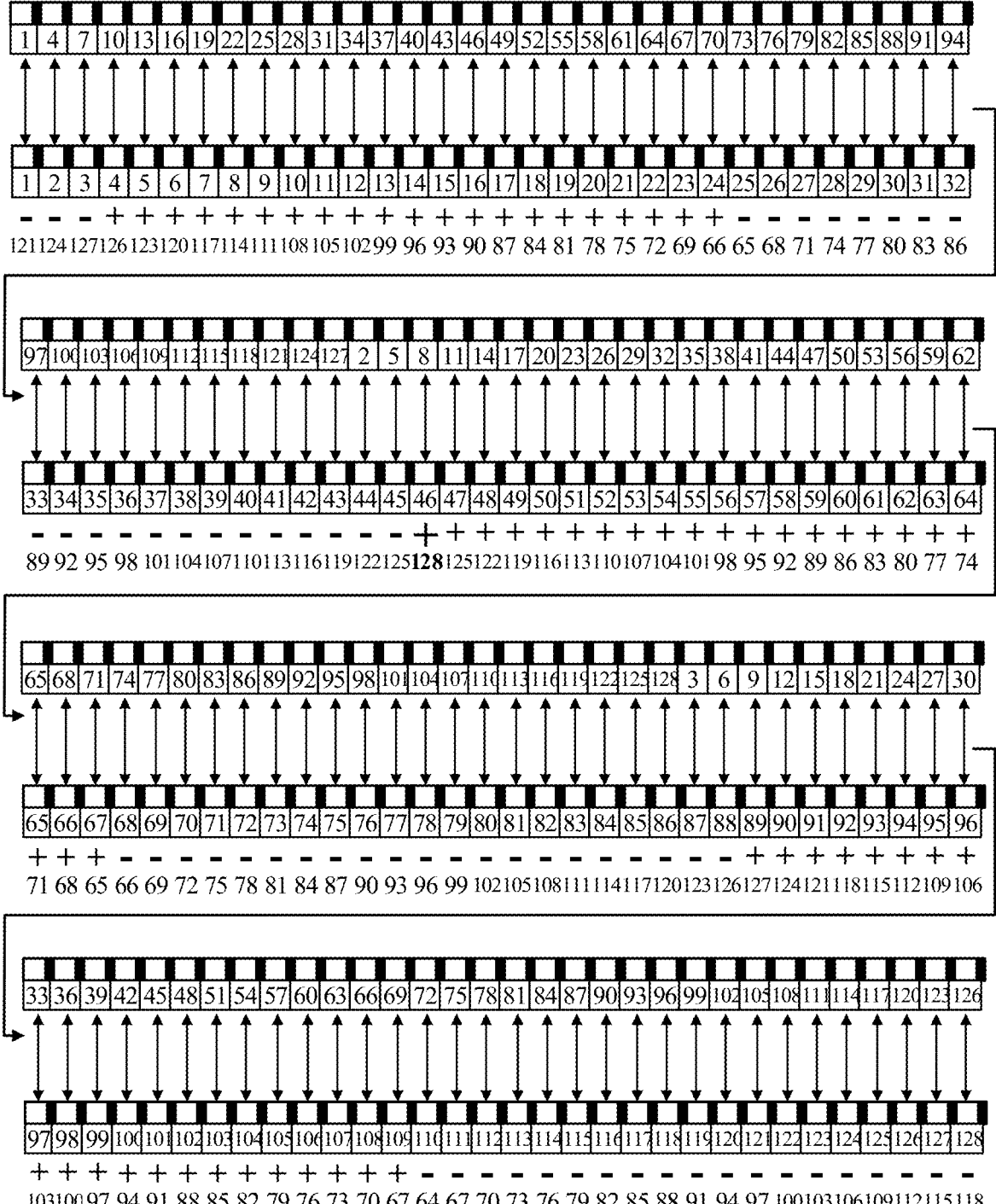
FIG. 32 is a schematic diagram of conversion between an actual corresponding viewpoint number and an actual physical arrangement number of a sub-pixel in a pixel island provided by an embodiment of the present disclosure.

It should be noted that in FIG. 30, the sub-pixels are spliced according to the order of viewpoints. During specific implementation, the order of viewpoints from small to large does not represent the actual position of sub-pixels in each pixel island group. As shown in FIG. 32, during actual layout, conversion should be performed between the actual corresponding viewpoint number of sub-pixels in the pixel island and the actual physical arrangement number. For example, the difference between the viewpoints of two adjacent sub-pixels corresponding to the light splitting structure may be set as M.

Of course, in some embodiments, N=K×n may also be an odd number; and the eye tracking system includes (N+1)/2 first cameras and (N+1)/2 second cameras. The determining the coordinates of the user's eyes through the eye tracking system, and determining the left eye view and the right eye view according to the coordinates of the user's eyes includes following steps.

Central coordinates of the user's eyes and a central viewpoint corresponding to the central coordinates are determined.

N first viewpoints are set in the region corresponding to the user's left eye according to a preset viewpoint interval from the central viewpoint, and N second viewpoints are set in the region corresponding to the user's right eye according to the preset viewpoint interval from the central viewpoint.

(N+1)/2 first cameras are respectively set at $[(N+1)/2]^{th}$ first viewpoints to the $N^{th}$ first viewpoint, (N+1)/2 second cameras are set at $[(N+1)/2]^{th}$ second viewpoints to the $N^{th}$ second viewpoint, the left eye view is obtained by using the (N+1)/2 first cameras, and the right eye view is obtained by using the (N+1)/2 second cameras.

In some embodiments, the determining the sub-pixels corresponding to the left eye view and the sub-pixels corresponding to the right eye view in each pixel island group includes: a light-emitting angular spectrum of each sub-pixel is acquired to obtain an angular spectrum boundary database; coordinates of a center of the user's eyes are determined according to the coordinates of the user's eyes: an included angle between the center of the user's eyes and a center of each pixel island group is determined; and according to the included angle between the center of the user's eyes and the center of each pixel island group and the light-emitting angle spectrum of each sub-pixel, a central sub-pixel corresponding to the center of the user's eyes is determined.

(N−1)/2 sub-pixels on a right side of the central sub-pixel correspond to the right eye view, and the (N−1)/2 sub-pixels on a left side of the central sub-pixel correspond to the left eye view; and when the coordinates of the center of the user's eyes are in a left half of the central sub-pixel, the central sub-pixel corresponds to the left eye view, and when the coordinates of the center of the user's eyes are in a right half of the central sub-pixel, the central sub-pixel corresponds to the right eye view.

To sum up, in the display device and the driving method thereof provided by an embodiment of the present disclosure, the projection width of the main lobe angle of view formed by the light emitted by the K×n sub-pixels at the optimal viewing distance of the display device is greater than or equal to ⅔ of the pupil distance, so that a plurality of different parallax images may enter the pupil on the basis that the left and right eyes have a correct parallax, so that the focus depth of a single eye is consistent with the convergence depth of double eyes, the viewing is free from dizziness, and visual fatigue may be avoided.

Although embodiments of the present disclosure have been described, those skilled in the art may make additional changes and modifications to these embodiments once they know the basic inventive concepts. Therefore, the appended claims are intended to be interpreted as including embodiments and all changes and modifications that fall within the scope of the present disclosure.

Obviously, those skilled in the art may make various modifications and variations to embodiments of the present disclosure without departing from the spirit and scope of embodiments of the present disclosure. Thus, provided that these modifications and variations of embodiments of the present disclosure are within the scope of the claims of the present disclosure and their equivalents, the present disclosure is also intended to include these modifications and variations.

What is claimed is:

1. A driving method of a display device, the display device comprising:

a display panel, comprising a plurality of pixel islands arranged in an array in a row direction and a column direction, wherein each of the plurality of pixel islands comprises n sub-pixels arranged at intervals in the row direction, and n is an integer greater than 1; and a light splitting assembly, located at a display side of the display panel, wherein the light splitting assembly comprises a plurality of light splitting repeating units extending in the column direction and successively arranged in the row direction; each of the light splitting repeating units comprises M light splitting structures extending in the column direction and successively arranged in the row direction; each light splitting repeating unit correspondingly covers K columns of pixel islands; and M and K are not equal, and a projection width of a main lobe angle of view formed by light emitted by K×n sub-pixels at an optimal viewing distance of the display device is greater than or equal to ⅔ of a pupil distance;

wherein the method comprises:

determining a first image driving signal corresponding to each of the plurality of pixel islands according to an image to be displayed in a two-dimensional display mode, and loading the corresponding first image driving signal to all sub-pixels in the pixel islands to form a two-dimensional image; and determining a gaze region and a non-gaze region of a user in the display device in a three-dimensional display mode, driving the gaze region to display an image with a first resolution and driving the non-gaze region to display an image with a second resolution according to the image to be displayed, wherein the first resolution is higher than the second resolution;

wherein the driving the gaze region to display the image with the first resolution and driving the non-gaze region to display the image with the second resolution according to the image to be displayed comprises:

determining coordinates of the user's eyes through an eye tracking system, and determining a left eye view and a right eye view according to the coordinates of the user's eyes;

rendering a plurality of first resolution images corresponding to the first resolution and a plurality of second resolution images corresponding to the second resolution according to the left eye view and the right eye view;

determining a sub-pixel corresponding to the left eye view and a sub-pixel corresponding to the right eye view in each pixel island group, wherein each pixel island group comprises K columns of pixel islands correspondingly covered by a light splitting repeating unit, and a direction of a connecting line of left and right eyes of the user is parallel to the row direction;

providing a driving signal corresponding to the left eye view to the sub-pixel corresponding to the left eye view, and providing a driving signal corresponding to the right eye view to the sub-pixel corresponding to the right eye view according to the first resolution images in the gaze region; and providing a driving signal corresponding to the left eye view to the sub-pixel corresponding to the left eye view, and providing a driving signal corresponding to the right eye view to the sub-pixel corresponding to the right eye view according to the second resolution images in the non-gaze region;

wherein the eye tracking system comprises N/2 first cameras and N/2 second cameras, wherein N=K×n and K×n is an even number; the determining coordinates of the user's eyes through the eye tracking system, and determining the left eye view and the right eye view according to the coordinates of the user's eyes comprises:

determining central coordinates of the user's eyes and a central viewpoint corresponding to the central coordinates;

setting (N−1) first viewpoints in a region corresponding to the user's left eye according to a preset viewpoint interval from the central viewpoint, and setting N second viewpoints in a region corresponding to the user's right eye according to the preset viewpoint interval from the central viewpoint; and setting the N/2 first cameras respectively at the $(N/2)^{th}$ first viewpoint to the $(N−1)^{th}$ first viewpoint, setting N/2 second cameras respectively at the $[(N/2)+1]^{th}$ second viewpoint to the $N^{th}$ second viewpoint, obtaining the left eye view by using the N/2 first cameras, and obtaining the right eye view by using the N/2 second cameras;

or wherein the eye tracking system comprises (N+1)/2 first cameras and (N+1)/2 second cameras, wherein N=K×n, and K×n is an odd number; the determining coordinates of the user's eyes through the eye tracking system, and determining the left eye view and the right eye view according to the coordinates of the user's eyes comprises:

determining central coordinates of the user's eyes and a central viewpoint corresponding to the central coordinates;

setting N first viewpoints in a region corresponding to the user's left eye according to a preset viewpoint interval from the central viewpoint, and setting N second viewpoints in a region corresponding to the user's right eye according to the preset viewpoint interval from the central viewpoint;

setting the (N+1)/2 first cameras respectively at the [(N+1)/2]$^{th}$ first viewpoint to the N$^{th}$ first viewpoint, setting the (N+1)/2 second cameras respectively at the [(N+1)/2]$^{th}$ second viewpoint to the N$^{th}$ second viewpoint, and obtaining the left eye view by using the (N+1)/2 first cameras and the right eye view by using the (N+1)/2 second cameras.

2. The method according to claim 1, wherein the determining the gaze region and the non-gaze region of the user in the display device comprises:

acquiring the gaze region of user's eyes in the display device through the eye tracking system; and determining a region in the display device other than the gaze region as the non-gaze region.

3. The method according to claim 1, wherein the eye tracking system comprises N/2 first cameras and N/2 second cameras, the determining the sub-pixel corresponding to the left eye view and the sub-pixel corresponding to the right eye view in each pixel island group comprises:

acquiring a light-emitting angular spectrum of each sub-pixel to obtain an angular spectrum boundary database;

determining coordinates of a center of the user's eyes according to the coordinates of the user's eyes;

determining an included angle between the center of the user's eyes and a center of each pixel island group; and determining a central sub-pixel corresponding to the center of the user's eyes according to the included angle between the center of the user's eyes and the center of each pixel island group and the light-emitting angle spectrum of each sub-pixel;

wherein if the coordinates of the center of the user's eyes are in a left half of the central sub-pixel, the central sub-pixel and (N/2)-1 sub-pixels on a right side of the central sub-pixel correspond to the right eye view, and the N/2 sub-pixels on a left side of the central sub-pixel correspond to the left eye view; and if the coordinates of the center of the user's eyes are in a right half of the central sub-pixel, N/2 sub-pixels on the right side of the central sub-pixel correspond to the right eye view, and the central sub-pixel and (N/2)-1 sub-pixels on the left side of the central sub-pixel correspond to the left eye view.

4. The method according to claim 1, wherein the eye tracking system comprises (N+1)/2 first cameras and (N+1)/2 second cameras, the determining the sub-pixel corresponding to the left eye view and the sub-pixel corresponding to the right eye view in each pixel island group comprises:

acquiring a light-emitting angular spectrum of each sub-pixel to obtain an angular spectrum boundary database;

determining coordinates of a center of the user's eyes according to the coordinates of the user's eyes;

determining an included angle between the center of the user's eyes and a center of each pixel island group; and determining a central sub-pixel corresponding to the center of the user's eyes according to the included angle between the center of the user's eyes and the center of each pixel island group and the light-emitting angle spectrum of each sub-pixel;

wherein (N−1)/2 sub-pixels on a right side of the central sub-pixel correspond to the right eye view, and (N−1)/2 sub-pixels on a left side of the central sub-pixel correspond to the left eye view; and when the coordinates of the center of the user's eyes are in a left half of the central sub-pixel, the central sub-pixel corresponds to the left eye view, and when the coordinates of the center of the user's eyes are in a right half of the central sub-pixel, the central sub-pixel corresponds to the right eye view.

5. The method according to claim 1, wherein K×n and M are coprime;

wherein light emitted from light-emitting regions of sub-pixels in K pixel islands after being split by the M light splitting structures forms a successive light-emitting region in space;

wherein in a horizontal direction, a width of the M light splitting structures is equal to a width of the K columns of pixel islands;

wherein the sub-pixels comprise sub-pixel opening regions; and in the row direction, a ratio of a total width of n sub-pixel opening regions to a width of each pixel island is greater than or equal to 0.9/M and less than or equal to 1;

wherein in the row direction, a ratio of a width of each sub-pixel opening region to the width of the pixel island is i/M; and i is an integer greater than or equal to 1 and less than or equal to M−1.

6. The method according to claim 5, wherein i=1, and in the row direction, the light-emitting regions of the sub-pixels in the K pixel islands are complementarily spliced with one another in space.

7. The method according to claim 5, wherein i>1, and in the row direction, the light-emitting regions of the sub-pixels in the K pixel islands overlap in space;

wherein in the row direction, the light-emitting regions of the sub-pixels in the K pixel islands overlap evenly in space.

8. The method according to claim 5, wherein in the row direction, an absolute value of a difference between widths of different sub-pixel opening regions is less than or equal to 2.5 microns.

9. The method according to claim 1, wherein the display device further comprises:

a spacer dielectric layer, located between the light splitting assembly and the display panel.

10. The method according to claim 9, wherein each light splitting structure is a cylindrical lens.

11. The method according to claim 10, wherein the cylindrical lens comprises a first resin layer with protrusions, and a planarized resin layer located on a side of the first resin layer facing away from the display panel; and a refractive index of the planarized resin layer is less than a refractive index of the first resin layer.

12. The method according to claim 11, wherein a radius of curvature of the cylindrical lens is greater than or equal to 1.01 r and less than or equal to 1.22 r;

wherein, $$r = \frac{(n1 - n2)}{n3} \times \frac{n3L1P1}{W},$$

n1 is the refractive index of the first resin layer or an e-light refractive index of the liquid crystal lens, n2 is the refractive index of the planarized resin layer or an o-light refractive index of the liquid crystal lens, n3 is a refractive index of the spacer dielectric layer, L1 is the optimal viewing distance of the display device, P1 is a width of the cylindrical lens in the row direction, and W is the projection width of the main lobe angle of view formed by the light emitted by the sub-pixels at the optimal viewing distance.

13. The method according to claim 10, wherein the cylindrical lens is a liquid crystal lens.

14. The method according to claim 1, wherein M is 3, K is 1, and n is 10; or, M is 3, K is 1 and n is 32; or, M is 3, K is 2 and n is 32; or, M is 3, K is 4 and n is 32.

15. The method according to claim 1, wherein every three pixel islands successively arranged in the column direction are a pixel repeating unit; and in the pixel repeating unit, display colors of the sub-pixels of a same pixel island are identical, and display colors of the sub-pixels of different pixel islands are different.

16. The method according to claim 1, wherein the display device further comprises:

the eye tracking system, configured to determine a position of user's eyes in real time.

\* \* \* \* \*